US010931964B2

(12) United States Patent
Symes et al.

(10) Patent No.: US 10,931,964 B2
(45) Date of Patent: Feb. 23, 2021

(54) VIDEO DATA PROCESSING SYSTEM

(71) Applicant: Arm Limited, Cambridge (GB)

(72) Inventors: Dominic Hugo Symes, Cambridge (GB); Sven Ola Johannes Hugosson, Lund (SE); Tomas Fredrik Edso, Lund (SE)

(73) Assignee: Arm Limited, Cambridge (GB)

( * ) Notice: Subject to any disclaimer, the term of this patent is extended or adjusted under 35 U.S.C. 154(b) by 111 days.

(21) Appl. No.: 15/914,154

(22) Filed: Mar. 7, 2018

(65) Prior Publication Data
US 2018/0270499 A1    Sep. 20, 2018

(30) Foreign Application Priority Data

Mar. 15, 2017    (GB) .................................... 1704100

(51) Int. Cl.
*H04N 19/52*  (2014.01)
*H04N 19/44*  (2014.01)
*H04N 19/176*  (2014.01)
*H04N 19/43*  (2014.01)
*H04N 19/102*  (2014.01)
*H04N 19/53*  (2014.01)
*H04N 19/156*  (2014.01)
*H04N 19/436*  (2014.01)

(52) U.S. Cl.
CPC ........... *H04N 19/52* (2014.11); *H04N 19/102* (2014.11); *H04N 19/156* (2014.11); *H04N 19/176* (2014.11); *H04N 19/43* (2014.11); *H04N 19/436* (2014.11); *H04N 19/44* (2014.11); *H04N 19/53* (2014.11)

(58) Field of Classification Search
CPC .. H04N 19/102; H04N 19/156; H04N 19/176; H04N 19/43; H04N 19/436; H04N 19/44; H04N 19/52; H04N 19/53
See application file for complete search history.

(56) References Cited

U.S. PATENT DOCUMENTS 8,542,939 B2    9/2013  Nystad
8,990,518 B2    3/2015  Nystad
(Continued)

OTHER PUBLICATIONS

Combined Search and Examination Report dated Aug. 25, 2017, GB Patent Application No. GB1704100.5.

*Primary Examiner* — Francis Geroleo
(74) *Attorney, Agent, or Firm* — Vierra Magen Marcus LLP

(57) ABSTRACT

An apparatus for encoding frames of a sequence of source frames of video image data to be encoded. The apparatus includes encoding circuitry configured to encode the source frames using reference frames. The apparatus also includes monitoring circuitry configured to, when the encoding circuitry is encoding a source frame using one or more reference frames, monitor the memory bandwidth being used when using the one or more reference frames when encoding the source frame. The apparatus further includes encoding circuitry that is operable to, in response to the monitored memory bandwidth being greater than a threshold, to control the encoding circuitry to encode a subsequent part of the source frame using a modified video encoding process to restrict the memory bandwidth usage when using one or more reference frames when encoding a subsequent part of a source frame.

21 Claims, 6 Drawing Sheets

(56) References Cited

U.S. PATENT DOCUMENTS

| | | | |
|---|---|---|---|
| 9,014,496 B2 | 4/2015 | Nystad | |
| 9,116,790 B2 | 8/2015 | Nystad | |
| 2005/0078749 A1* | 4/2005 | Ju | H04N 19/176 375/240.12 |
| 2007/0104272 A1 | 5/2007 | He | |
| 2012/0007992 A1* | 1/2012 | Zhou | H04N 19/436 348/206 |
| 2013/0094570 A1* | 4/2013 | Cismas | H04N 19/433 375/240.02 |
| 2015/0277521 A1* | 10/2015 | Jain | G06F 1/3225 713/300 |

* cited by examiner

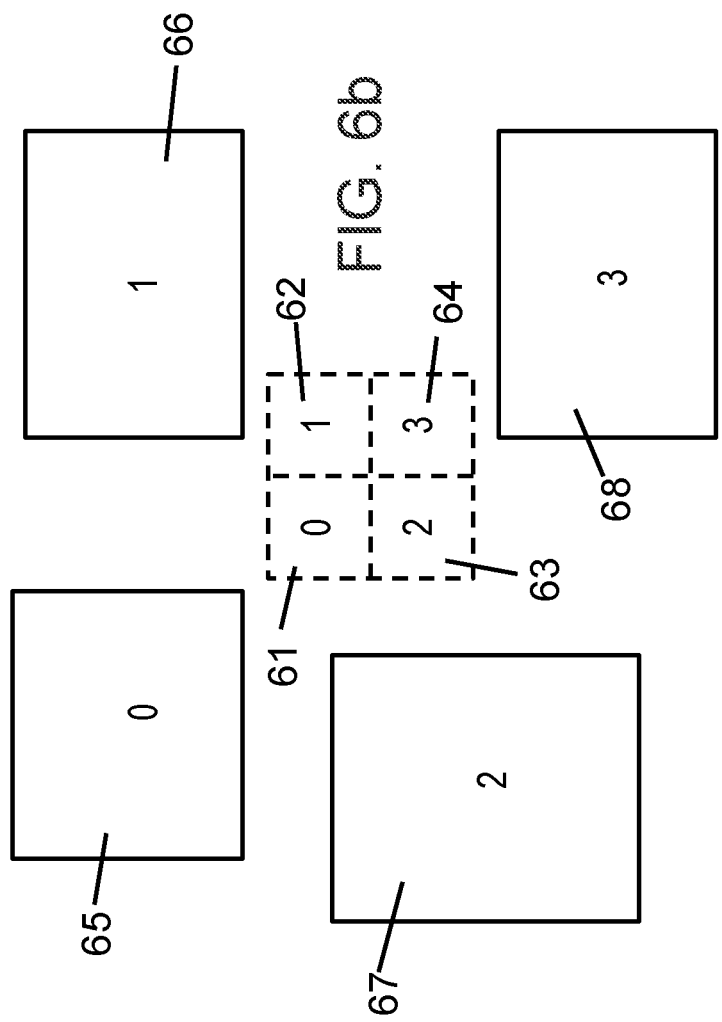
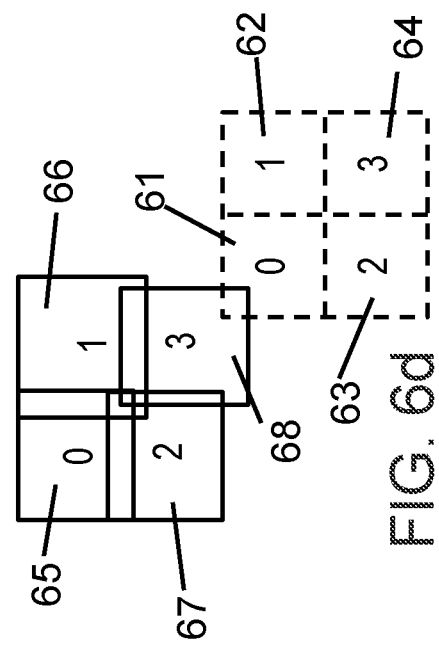
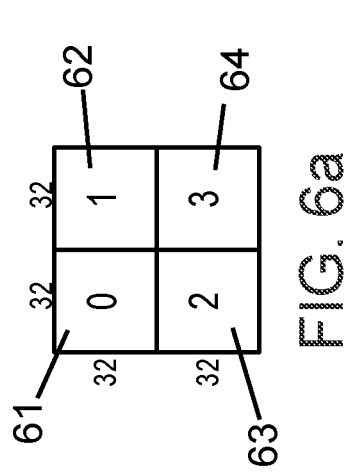
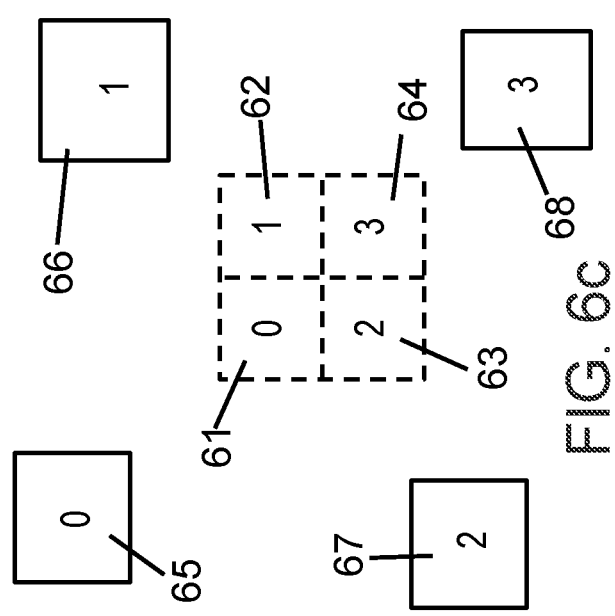

VIDEO DATA PROCESSING SYSTEM

BACKGROUND

The technology described herein relates to the processing of video data, and in particular to methods of and apparatus for encoding video image data.

So that video images may be generated by one device (e.g. a video camera) and then transmitted (streamed) over a link (e.g. via the internet) to be viewed on another device (e.g. a computer), video image data (e.g. RGB or YUV values) is generally encoded for transmission in the format of an encoded bitstream, according to a predetermined video encoding format. Video encoding formats can enable a significant reduction in the file size of video image data (which thus aids the efficient streaming of the video image data) without a significant visible loss of image quality when the video images are subsequently decoded and viewed.

Video image data is typically generated as a sequence of frames, with each video frame generally being divided into a plurality of blocks (typically rectangles (including squares)) of pixels of the frame. Each block is encoded and then decoded individually. In "differential" video coding standards (such as VP9 and HEVC), frames in the sequence of frames to be encoded (which can be thought of as "source" frames to be encoded) are usually encoded with reference to another, e.g. previously encoded, reference frame or frames of the sequence of frames to be encoded (which other frame or frames can accordingly be thought of as a "reference" frame(s) for the (source) frame being encoded). In some encoding standards this may be done by dividing each source frame into a plurality of blocks of pixels and encoding (and subsequently decoding) each block with respect to other encoded data, e.g. one or more reference blocks from one or more frames (such as a corresponding encoded block of pixels in a reference frame).

Each encoded data block for a source frame that has been encoded would therefore usually be defined by a vector value(s) (the so-called "motion vector(s)") pointing to the corresponding data block(s) in the corresponding reference frame(s) and data (the "residual(s)") describing the differences between the data in the data block of the source (i.e. current) frame and the reference frame data block(s). (This thereby allows the video data for the block of the source (current) frame to be constructed from the video data pointed to by the motion vector(s) and the difference data describing the difference(s) between the block(s) of the reference frame(s) and the block of the source frame.)

In order to identify an appropriate block in a reference frame for differentially encoding a block of pixels in a source frame, a process known as "motion estimation" is typically used. Motion estimation typically comprises searching one or more different regions of one or more reference frames and comparing these regions with the block in the source frame to identify block(s) of pixels in the reference frame(s) to use for the differential encoding of the block in the source frame. Once the necessary blocks have been identified the motion vector(s) and the residual(s) can be determined. Such a process of motion estimation may cause problems in the video processing system owing to the large and potentially variable memory bandwidth when using the reference frames (e.g. when the video encoder reads the regions of the reference frames) for the encoding. This in turn may cause conflict with other demands for memory bandwidth when implemented in a larger processing system, e.g. owing to the finite resources of the system.

The Applicants believe that there remains scope for improved methods of and apparatus for encoding video image data.

BRIEF DESCRIPTION OF THE DRAWINGS

A number of embodiments of the technology described herein will now be described by way of example only and with reference to the accompanying drawings, in which:

FIGS. 6a, 6b, 6c, and 6d show schematically search procedures involving blocks of video image data during operation of embodiments of the technology described herein.

DETAILED DESCRIPTION

Figure 1:
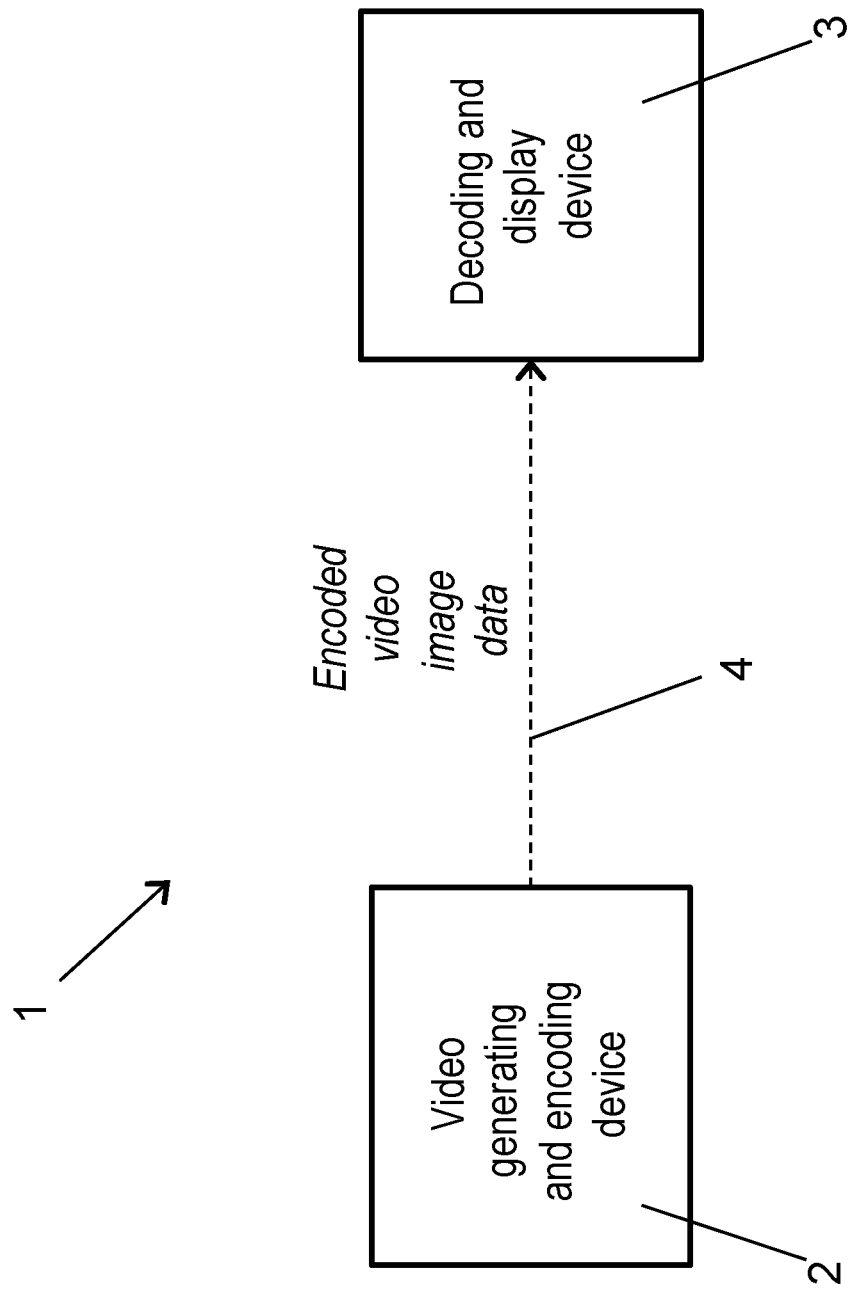
FIGS. 1, 2 and 3 show schematically a system for encoding and decoding video image data in an embodiment of the technology described herein.

One embodiment of the technology described herein comprises a method of encoding frames of a sequence of source frames of video image data to be encoded, the method comprising:

using a video encoding process that encodes at least some of the frames of the sequence of source video frames to be encoded using one or more reference frames derived from one or more other source frames in the sequence of source video frames;

the method further comprising:

when encoding a source frame of the sequence of source video frames using one or more reference frames, monitoring the memory bandwidth being used when using the one or more reference frames when encoding the source frame; and when the monitored memory bandwidth is greater than a threshold:

encoding a subsequent part of the source frame using a modified video encoding process to restrict the memory bandwidth usage when using one or more reference frames when encoding the subsequent part of the source frame.

Another embodiment of the technology described herein comprises an apparatus for encoding frames of a sequence of source frames of video image data to be encoded, the apparatus comprising:

encoding circuitry configured to:

encode, using a video encoding process, at least some of the frames of the sequence of source video frames to be encoded using one or more reference frames derived from one or more other source frames in the sequence of source video frames;

monitoring circuitry configured to, when the encoding circuitry is encoding a source frame of the sequence of source video frames using one or more reference frames:

monitor the memory bandwidth being used when using the one or more reference frames when encoding the source frame; and control circuitry operable to:

in response to the monitored memory bandwidth being greater than a threshold:

control the encoding circuitry to encode a subsequent part of the source frame using a modified video encoding process to restrict the memory bandwidth usage when using one or more reference frames when encoding the subsequent part of the source frame.

In the technology described herein, a sequence of source frames is encoded (e.g. by encoding circuitry) using a video encoding process. The video encoding process encodes at least some of the source frames in the sequence using one or more reference frames. The reference frames are derived from one or more other source frames in the sequence of source frames (i.e. source frames in the sequence that are not the source frame being encoded). The encoded source frames are then able to be, e.g., transmitted (streamed) for subsequent decoding to provide output video image data for the sequence of frames, e.g. for display.

When a source frame is being encoded using one or more reference frames, the memory bandwidth being used for the reference frame(s) (e.g. when reading the reference frame, e.g., from a memory into a cache) when encoding the source frame is monitored (e.g. using monitoring circuitry). Thus, the reference frames for which the memory bandwidth usage is monitored are those being used when the source frame (or a part (e.g. block) thereof) is being encoded.

When the monitored memory bandwidth used for reference frame(s) (when encoding a source frame) is greater than a threshold, the video encoding process is modified in order to restrict the memory bandwidth used for the reference frames. A subsequent part of the source frame is thus encoded using the modified video encoding process (i.e. different from the encoding process being used when the memory bandwidth was below the threshold), such that the memory bandwidth usage for the reference frame(s) is restricted for the subsequent encoding. (In some embodiments the comparison of the memory bandwidth with the threshold may have the additional limitation that the video encoding process is modified when the monitored memory bandwidth is greater than or equal to a threshold. However, in an embodiment, the comparison is that the monitored memory bandwidth is greater than a threshold.)

In a video encoding system, the memory bandwidth of the input frame data (representing frames of video image data to be encoded) is fixed by the nature of the input video image data provided and thus cannot be controlled by the encoder. Furthermore, the bitrate of the encoded video image data output by the encoding system, while able to be controlled, is generally significantly less than the input memory bandwidth.

The Applicant has appreciated that when source frames of video data are to be (e.g. differentially) encoded using reference frames, the regions of the reference frames that are searched during the motion estimation process to find the corresponding reference blocks, for example, may be large, e.g. when there is a lot of relative motion between frames, e.g. in different directions. This can cause the memory bandwidth used when using reference frames to be potentially large and unpredictable, particularly when multiple reference frames are used to encode a source frame.

By restricting the memory bandwidth being used when using reference frame(s) to encode a source frame in the manner of the technology described herein (e.g. below a target bandwidth per frame), the potentially large and variable memory bandwidth usage when using reference frame (s) in a video encoding process (e.g. owing to multiple reference frames being used per source frame and large areas within each reference frame being read to search for corresponding blocks) may be controlled in order to restrict the memory bandwidth, e.g. below a target bandwidth per frame. This is achieved in the technology described herein by modifying the video encoding process by which a source frame is being encoded using reference frame(s). This helps to provide a more predictable memory bandwidth for the encoding process overall, thus, e.g., helping to free up resources for use elsewhere in a system.

It will be understood that owing to the restriction on the memory bandwidth usage implemented through modification of the video encoding process (e.g. by modifying a set of encoding parameters used by the encoding), the restriction on the memory bandwidth usage is not a restriction on (and therefore a direct reduction of) the memory bandwidth itself (e.g. through the implementation of a hard limit) but rather (in some embodiments) a restriction on how reference frame(s) are used (by the modified encoding process) when encoding the subsequent part of a source frame (with the expectation that the restriction on how reference frame(s) are used (by the modified encoding process) when encoding the subsequent part of a source frame will, in the normal course, have the effect of constraining and reducing the memory bandwidth that will actually be used when encoding the subsequent part of the source frame).

For example, the restriction may have the effect that the set of reference frame data available to be used is restricted when encoding the source frame using the modified video encoding process. Thus, in an embodiment, the modification to the video encoding process restricts the choice of data that is allowed to be used from one or more reference frames when encoding the subsequent part of the source frame.

Thus, the implementation of the modified video encoding process will restrict and generally reduce the memory bandwidth usage when using reference frames for encoding a source frame (e.g. compared to when the original video encoding process were to be continued to be used without modification).

However, the modified video encoding process may not (in some circumstances) lead to a direct or immediate reduction of the memory bandwidth usage when using reference frames in the encoding of a source frame. For example, although a (e.g. set of) reference frame data may be restricted, the memory bandwidth being used when using reference frame(s) to encode a subsequent part of a source frame may not reduce owing to the amount (e.g. density) of reference frame data (e.g. in the restricted set thereof) in the part of the reference frame(s) being used in the encoding.

The sequence of source frames of video data that are provided and encoded in the technology described herein may be any suitable and desired sequence of source video frames. There will be at least two frames in the sequence of source video frames, but, in an embodiment, there are more than two frames in the sequence of source video frames.

In an embodiment, the sequence of frames to be encoded is provided in the form of a stream of input frame data representing the sequence of source frames of video data that is then encoded in the manner of the technology described herein to provide an encoded bitstream of data. The encoded bitstream may then be transmitted and decoded to provide a sequence of output video frames, e.g., for the purposes of display.

Thus, in an embodiment, the method comprises (and the encoding circuitry is configured to) receiving a sequence of source frames of video image data to be encoded, and encoding a source frame or frames in the manner of the technology described herein.

Source frames of video image data may be encoded using (e.g. relative to) one or more reference frames (which are themselves derived from one or more other source frames in the sequence of source frames), in any suitable and desired way. In an embodiment, a source frame is encoded using reference frame(s) in the normal manner for the video encoding format, e.g. VP9, being used.

In an embodiment, source video frames are encoded in a blockwise fashion in the bitstream of encoded video image data, i.e. each source frame of video data that is encoded is divided into respective blocks of pixels (sampling positions) representing respective regions (areas) of the source video frame, which blocks are then respectively individually encoded within the encoded video image data bitstream (i.e. such that respective individual blocks can be identified and decoded from the encoded video image data).

Thus, in an embodiment, the method comprises (and the encoding circuitry is configured to) processing a source frame of video image data (e.g. for a source frame that the input frame data represents) to divide the source video frame into blocks for encoding purposes.

When a source frame is encoded relative to a reference frame or frames, in an embodiment, each block of pixels within the source frame is encoded with respect to a corresponding block of pixels in the one or more reference frames. In an embodiment, an encoded data block (for a source frame) comprises one or more motion vectors pointing to data for one or more reference frames and one or more residuals describing the differences between the data encoded in the current data block (of the source frame) and the reference encoded data (of the one or more reference frames).

(In some video coding standards, e.g. VP9, this is usually done by dividing each source frame of video image data into a plurality of rectangular blocks of pixels of the frame, and encoding (and subsequently decoding) each block individually with respect to other encoded data, e.g. a reference block from a reference frame.)

The blocks of data that the video frames are subdivided into for the encoding process may be any suitable and desired blocks of the video frames. In an embodiment, they are rectangular in shape, e.g. square. The rectangular blocks may take any suitable and desired size. In an embodiment, the rectangular blocks each have a size between and including 8×8 pixels and 64×64 pixels, e.g. with each edge of the rectangular blocks having a size of $2^n$ pixels, where n is an integer (e.g. between and including 3 and 6).

In an embodiment, a given frame may comprise blocks of plural different sizes, e.g. that tessellate over the area of the frame, and/or the size and number of the blocks may change between different frames, e.g. depending on the video image data of the frame.

The one or more reference frames may be derived from one or more other source frames in the sequence of source video frames (i.e. source frames other than the source frame being encoded) in any suitable and desired way. In an embodiment, the one or more reference frames are derived from one or more previously encoded (and, e.g., decoded) source frames respectively. Thus, in an embodiment, the one or more reference frames comprise one or more reconstructed source frames, e.g. that have been encoded and decoded (such that the reference frames, although derived from the source frames, are not the original source frames).

One or more other frames in the sequence of source frames from which one or more reference frames are derived should be, one or more frames in the sequence of source frames that have been encoded previously (one or more previously encoded source frames), but these frames do not necessarily have to be previous frames in the sequence of source frames (as an encoder may encode frames out of order, in order to get a reference frame from a future, and/or from both a previous and a future frame, etc., in a sequence of source frames being encoded, when desired).

Thus, one or more frames in the sequence of source frames from which one or more reference frames are derived may be future frames in the sequence of source frames, as well as being previous frames in the sequence of source frames.

In an embodiment one or more reference frames are stored, e.g. in a, e.g. main, memory associated with the encoding circuitry, so that they (or at least regions thereof) may be retrieved (i.e. read) when they are to be used for encoding a source frame. As will be outlined below, in an embodiment, (e.g. smaller) regions (e.g. blocks) of one or more reference frames are (e.g. also) stored in a cache (e.g. locally to the encoding circuitry) so that such regions may be retrieved easily when required for encoding.

In an embodiment the one or more reference frames stored are one or more previously encoded source frames and thus, in an embodiment, the one or more reference frames are stored in an encoded (e.g. compressed) form. The reference frames may be compressed using any suitable and desired compression technique, e.g. using the frame buffer compression techniques described in the Applicant's U.S. Pat. No. 8,542,939 B2, U.S. Pat. No. 9,014,496 B2, U.S. Pat. No. 8,990,518 B2 and U.S. Pat. No. 9,116,790 B2.

Thus, in an embodiment, the method comprises (and the encoding circuitry is configured to) storing the (e.g. each) encoded source frame for use as (e.g. in deriving) a reference frame. In an embodiment, the method also comprises (and encoding circuitry is configured to) reading the (e.g. one or more previously encoded source frames for use as (e.g. in order to derive)) one or more reference frames when encoding a source frame.

In an embodiment, the apparatus comprises a cache for storing data of one or more reference frames, e.g. locally to the encoding circuitry. This helps to provide a convenient location for (e.g. regions of) the reference frames to be read from when encoding source frames. It will be appreciated that in some embodiments the cache may not store reference frames as a whole but rather only a part (e.g. blocks) thereof. Thus, in an embodiment, once reference frames have been encoded (as previous source frames) they are written to (e.g. off-chip) memory, from where (e.g. parts of the) reference frame(s) can be retrieved into the cache as and when they are required. It is this retrieval of the reference frame(s) from the memory into the cache which may form the majority of the memory bandwidth usage for the reference frames.

The memory bandwidth being used when using one or more reference frames when encoding a source frame may be monitored in any suitable and desired way. In an embodiment the memory bandwidth is monitored when (e.g. part or blocks of the) one or more reference frames are read (by the encoding circuitry, e.g. from the memory into the cache) to be used for encoding a source frame.

In an embodiment, the method comprises (and the monitoring circuitry is configured to) monitoring the memory bandwidth by monitoring a measure representative of the data read (by the encoding circuitry, e.g. from the memory into the cache) when using (e.g. part or blocks of the) one of more reference frames for encoding a source frame. In an embodiment, the measure representative of the data read for the one of more reference frames comprises the amount of data (e.g. in bytes) read (by the encoding circuitry, e.g. from the memory into the cache) when using (e.g. part or blocks of) one of more reference frames for encoding a source frame.

In an embodiment, the measure is based on, e.g. comprises, the number of (e.g. cache) accesses (e.g. by the cache to the memory) to (e.g. part or blocks of) one or more reference frames used when encoding a source frame. Thus, when the apparatus comprises a cache for storing data of one or more reference frames, in an embodiment, the monitoring circuitry comprises one or more counters (e.g. one or more accumulators) for determining the number of accesses by the cache to the memory for (e.g. part or blocks of) one or more reference frames used when encoding a source frame. In an embodiment, the cache counter is configured to determine the measure representative of the data read (e.g. the amount of data) when using (e.g. part or blocks of) one of more reference frames for encoding a source frame.

The one or more cache counters (e.g. accumulator(s)) may (e.g. each) comprise one or more registers (e.g. a register for the reference frame memory bandwidth of a source frame or block currently being encoded and a register for the reference frame memory bandwidth of a source frame or block previously encoded).

The monitoring of the memory bandwidth being used when using one or more reference frames in the encoding may be performed in any suitable and desired way, e.g. in accordance with the embodiments discussed above. In an embodiment the method comprises using (and the monitoring circuitry is configured to execute) firmware (configured) to monitor the memory bandwidth being used when using one or more reference frames. Thus, in an embodiment, the firmware is configured to monitor the measure representative of the data read (e.g. the number of accesses to memory by the cache and/or the amount of data), when using one of more reference frames for encoding a source frame, that is determined by the cache counter.

The monitoring of the memory bandwidth being used when using one or more reference frames to encode a source frame may be performed for any suitable and desired duration and at any suitable and desired frequency, e.g. for the source frame in the sequence of source frames being encoded. In an embodiment, the memory bandwidth being used when using one or more reference frames to encode a source frame is monitored (e.g. periodically) a plurality of times for the source frame being encoded. This helps the memory bandwidth being used when using the one or more reference frames to be monitored (and thus modifications to be made to the encoding process) at a faster rate than the rate at which source frames in the sequence of source frames are encoded.

When a source frame is divided into blocks of pixel data for the purposes of encoding, with the blocks of the source frame being encoded using corresponding blocks in one or more reference frames, the memory bandwidth (when using one or more of the blocks in the one or more reference frames) may be monitored for each block of the source frame being encoded. However, in an embodiment, the memory bandwidth being used (when using one or more of the blocks in one or more reference frames) is monitored for respective groups of a plurality of blocks of a source frame being encoded. Monitoring the memory bandwidth less frequently than for each block of a source frame being encoded helps to avoid changes to the video encoding process being made unnecessarily frequently, e.g. owing to a sharp spike in the memory bandwidth for just one or a limited number of blocks (and thus, e.g., the effects of short term changes in the memory bandwidth are damped).

A (and each) group of a plurality of blocks of a source frame being encoded may contain any suitable and desired number of blocks. In an embodiment a (and, e.g., each) group comprises a row of blocks of the source frame, e.g. extending across the (e.g. entire) width of the source frame.

Thus, it will be appreciated that the technology described herein may be used to encode frames of video image data in a blockwise fashion. Therefore, in an embodiment, the method comprises (and the respective encoding, monitoring and control circuitry of the apparatus is configured to):

using a video encoding process that encodes blocks of at least some of the frames of the sequence of source video frames to be encoded using one or more reference blocks derived from blocks of one or more other source frames in the sequence of source video frames;

the method further comprising:

when encoding one or more blocks of a source frame of the sequence of source video frames using one or more reference blocks, monitoring the memory bandwidth being used when using the one or more reference blocks when encoding the one or more source blocks; and when the monitored memory bandwidth is greater than a threshold:

encoding subsequent blocks of the source frame using a modified video encoding process to restrict the memory bandwidth usage when using one or more reference blocks when encoding the subsequent blocks of the source frame.

Although, in an embodiment, the memory bandwidth is monitored for a group of a plurality of blocks of a source frame at a time, in an embodiment, when the apparatus comprises a cache counter, the method comprises (and the cache counter is configured to) determining, for each block of a source frame that is encoded, the number of accesses by the cache to the memory for the (e.g. part or blocks of the) one or more reference frames used (or the measure representative of the data read) when encoding the source frame. Knowing how many accesses by the cache to the memory there have been for each block of a source frame being encoded helps to ensure deterministic operation of the encoding process (i.e. in that the same bitstream for an encoded source frame will be generated, e.g. regardless of (e.g. bus) timing). Thus, in an embodiment, the cache counter operates at a faster rate (e.g. per block) than the monitoring of the memory bandwidth which, in an embodiment, operates per group of a plurality of blocks of the source frame being encoded.

The determination (of, e.g., the number of accesses by the cache to the memory or the measure representative of the data read) by the cache counter may be used, e.g. by the monitoring circuitry, in any suitable and desired way to monitor the memory bandwidth (e.g. such that the monitoring operates at a rate that is less than the rate at which the cache counter determines the accesses by the cache to the memory). In an embodiment, the information (e.g. accesses by the cache to the memory per block) determined by the cache counter is combined to provide a measure, in an embodiment, a moving average or accumulated total, which is monitored (by the monitoring circuitry) to assess the memory bandwidth (e.g. for a group of a plurality of blocks of a source frame over which the measure (e.g. moving average or accumulated total) is determined). Thus all the information (e.g. accesses by the cache to the memory) determined by the cache counter are used in the monitoring of the memory bandwidth, but at a rate that is less than for each block of the source frame being encoded.

The control circuitry is configured to control the encoding circuitry to use a modified video encoding process, in response to the monitored memory bandwidth being greater than a threshold. In an embodiment, the method comprises (and the control circuitry is configured to) comparing the monitored memory bandwidth with the threshold. In an embodiment, e.g. following the comparison, in response to the monitored bandwidth being greater than the threshold, the method comprises (and the control circuitry is configured to) signalling to the encoding circuitry, i.e. to indicate that the modified video encoding process is to be used (e.g. from this point onwards) for encoding a subsequent part of the source frame. In an embodiment, the encoding circuitry is configured to act on the signal, i.e. to encode the subsequent part of the frame using the modified encoding process.

The monitoring, control and/or encoding circuitry may be configured to perform these steps in any suitable and desired way. In one embodiment, when the monitored memory bandwidth is greater than the threshold, (e.g. firmware running on) the monitoring circuitry is configured to control (e.g. firmware running on) the control circuitry to signal to the encoding circuitry that a modified video encoding process is to be used (e.g. from this point onwards) for encoding a subsequent part of the source frame, such that the encoding circuitry is thus controlled to encode a subsequent part of the source frame using the modified video encoding process.

In an embodiment, the (e.g. firmware running on the) control circuitry is configured to set a new (e.g. modified) set of encoding parameters to be used by the encoding circuitry when encoding a subsequent part of the source frame using the modified video encoding process. This (e.g. modified) set of encoding parameters is then signalled to or read by the encoding circuitry (e.g. upon the control circuitry signalling to the encoding circuitry) for using when encoding a subsequent part of the source frame using the modified video encoding process.

The threshold for the monitored memory bandwidth may be any suitable and desired level (i.e. of memory bandwidth usage when using one or more reference frames in the encoding of a source frame). In an embodiment, the threshold is selected, e.g. pre-defined, derived or set, e.g. before each stream of input frame data (representing a sequence of source frames) is encoded. In an embodiment, the level of the threshold is chosen such that it has an effect in restricting the memory bandwidth being used (e.g. when the usage is significantly above an average level) when using one or more reference frames when encoding a subsequent part of a source frame. For example, the level of the threshold may be set that for at least some of the periods of higher memory bandwidth usage the modified video encoding process is used. However, as will be appreciated and as explained previously, owing to the restriction being implemented through modification of the video encoding process, this may not always result directly or immediately in a reduction in the memory bandwidth usage.

In an embodiment, the threshold corresponds to (e.g. is set as) the, e.g. measure, used to monitor the memory bandwidth usage when using the reference frame(s). This helps to allow a direct comparison to be made. Thus, in an embodiment, the threshold corresponds to a measure representative of the data read when using one or more reference frames for encoding a source frame, e.g. an amount of data (e.g. a number of bytes), a number of accesses by the cache to the memory, etc.

In an embodiment, the threshold is (e.g. selected) based on a target memory bandwidth usage for encoding a source frame as a whole. In an embodiment, the target memory bandwidth is a maximum threshold that should not be exceeded for a source frame being encoded. In an embodiment, the target memory bandwidth for encoding a source frame as a whole covers the entire encoding process, e.g. not just the loading of one or more reference frames being used to encode the source frame. As discussed below, the threshold for assessing the monitored memory (reference frame) bandwidth may be determined by subtracting other contributions to the total memory bandwidth for encoding a source frame as a whole. The target memory bandwidth usage for encoding a source frame as a whole may have any suitable and desired value. In one example, e.g. for a 1080p30 sequence of video frames (1920×1080 resolution at 30 frames per second), the target memory bandwidth may be between 8 MB and 16 MB per frame.

Thus, in an embodiment, the threshold is lower than the target memory bandwidth usage for encoding a source frame as a whole, in an embodiment, lower than the target reference frame memory bandwidth usage (i.e. the memory bandwidth usage limit allocated for loading the reference frame(s) when encoding, which is, in an embodiment, based on the target memory bandwidth usage for encoding a source frame as a whole with, for example, the other contributions to the total memory bandwidth subtracted), to attempt to prevent the (e.g. total) memory bandwidth reaching or exceeding its target limit.

In an embodiment, the target memory bandwidth (e.g. the total for encoding a source frame as a whole) is set as an input parameter for a sequence of source frames to be encoded. In an embodiment, the target memory bandwidth is set (e.g. when configuring the apparatus or video data processing system) externally to the processing circuitry of the apparatus, e.g. by a driver or a video data processing system that may comprise the apparatus of the technology described herein, as these components may know the bandwidth limits of the system. The target memory bandwidth may be influenced by (e.g. selected based on) the available system requirements, e.g. other bandwidth requirements or restrictions in the system. For example, in a more constrained system when there may be a greater number of other factors to be balanced with, a lower threshold (and, e.g., a lower target memory bandwidth) may be used (e.g. selected). As will be appreciated, the trade off with restricting the memory bandwidth being used when using reference frames is the quality of the encoding of the source frames and thus the picture quality able to be assembled when decoding (e.g. owing to the, e.g. lossy, nature of the encoding format). As will be discussed below, other input parameters may be determined, e.g. by (a component of) the apparatus, using the target memory bandwidth and may therefore take into account some or all of the factors discussed above.

The memory bandwidth may be compared to just a single threshold, i.e. to determine when the memory bandwidth being used is greater than the threshold. However, in some embodiments the memory bandwidth is compared to a plurality of (e.g. different) thresholds, e.g. to correspondingly implement one of a plurality of (e.g. different) modified video encoding processes to restrict the memory bandwidth usage. This may help to provide a more refined set of restrictions to choose from for the memory bandwidth usage depending on the monitored memory bandwidth usage, e.g. to help to maintain a relatively constant (and therefore predictable) memory bandwidth usage when using one or more reference frames.

Such multiple thresholds may be implemented in any suitable and desired way, e.g. the memory bandwidth may be compared the multiple thresholds simultaneously or sequentially. In an embodiment, each of the plurality of thresholds corresponds to a different amount of memory bandwidth usage when using one or more reference frames to encode a source frame, e.g. each of the thresholds may be defined as outlined above.

In an embodiment the method comprises (and the control and encoding circuitry is configured to) when the monitored memory bandwidth is greater than a first threshold representing a first level of memory bandwidth usage: encoding a subsequent part of the source frame using a first modified video encoding process to restrict the memory bandwidth being used when using one or more reference frames when encoding the subsequent part of the source frame; and when the monitored memory bandwidth is greater than a second threshold representing a second level of memory bandwidth usage, wherein the second level is higher than the first level: encoding a subsequent part of the source frame using a second modified video encoding process to (e.g. further) restrict the memory bandwidth being used when using one or more reference frames when encoding the subsequent part of the source frame.

A third (or even further) threshold(s) (each at a successively higher level than the preceding threshold) may be used to implement a third (or even further) modified video encoding process(es) to (e.g. further) restrict the memory bandwidth usage, when necessary, e.g. when it continues to rise following the implementation of the second modified encoding process. Implementing multiple thresholds, and therefore one of multiple restrictions, in this way helps to restrict the memory bandwidth usage, e.g. below a target memory bandwidth for encoding a source frame, when the first (or further) modification to the video encoding process is insufficient to restrict the memory bandwidth usage as may be desired.

In one embodiment the monitored memory bandwidth is compared to both the first and second (e.g. plurality of) thresholds, e.g., simultaneously (e.g. such that it may be determined how to modify the video encoding process straight away), and when the monitored memory bandwidth is greater than a respective threshold the corresponding modified video encoding process is implemented. Thus, in this embodiment, the first modified video encoding process is used when the monitored memory bandwidth is greater than the first threshold and less than the second threshold. This enables a modified video encoding process that provides a greater restriction on the memory bandwidth usage to be used when the monitored memory bandwidth is particularly high, e.g. in an attempt to reduce the memory bandwidth usage quickly.

In another embodiment the monitored memory bandwidth is compared to second threshold after the monitored memory bandwidth has been compared to the first threshold and the first modified video encoding process has been implemented (e.g. such that a greater restriction is placed on the memory bandwidth usage when the memory bandwidth being used continues to rise despite a previous modification to the video encoding process). The monitored memory bandwidth may be compared to the second threshold a period of time after the monitored memory bandwidth has been compared to the first threshold, e.g. so that it may be assessed when the first modified video encoding process has succeeded in reducing the memory bandwidth usage.

Thus, in an embodiment, the memory bandwidth is continued to be monitored, e.g. while the subsequent part of the source frame is being encoded (as discussed below this may also allow the encoding process to be returned to the original state, i.e. thus lifting the memory bandwidth restriction).

In one embodiment the Applicant has appreciated that the ability to implement one of multiple (e.g. different) restrictions on the memory bandwidth usage (by using one of multiple (e.g. different) modified video encoding processes for a subsequent part of a source frame) may be implemented using a single threshold. In this embodiment the method comprises (and the monitoring, control and encoding circuitry are configured to): when the monitored memory bandwidth is greater than the threshold: encoding a subsequent part of the source frame using a first modified video encoding process to restrict the memory bandwidth being used when using one or more reference frames when encoding the subsequent part of the source frame (or a subsequent source frame in the sequence of source frames) and monitoring the memory bandwidth being used when using one or more reference frames when encoding the subsequent part of the source frame (or a subsequent source frame in the sequence of source frames); and when the monitored memory bandwidth being used remains greater than the (e.g. same) threshold (e.g., after a given time period), encoding a subsequent part of the source frame using a second modified video encoding process to (e.g. further) restrict the memory bandwidth being used when using one or more reference frames when encoding the subsequent part of the source frame.

Thus, in this embodiment, a second (further) modification to the video encoding process is made when, e.g. a period of time after implementing the first modified video encoding process, it is determined that the memory bandwidth usage has not reduced (and thus remains above the threshold). This may, for example, allow for a greater restriction to be placed on the memory bandwidth usage when the monitored memory bandwidth being used does not reduce after a previous modification is made to the encoding process. Thus, in an embodiment, the second modified video encoding process restricts the memory bandwidth usage more than the first modified video encoding process. As with the other embodiments that use multiple modified video encoding process(es), a third (or even further) modified video encoding process(es) may be used when the memory bandwidth being used continues to remain above the threshold, e.g. following further monitoring of the memory bandwidth being used.

The memory bandwidth may be assessed as being greater than the threshold(s), e.g. the memory bandwidth compared with the threshold(s), at any suitable and desired rate (e.g. relative to the encoding of a source frame). In an embodiment the memory bandwidth is assessed at the same rate at which the memory bandwidth is monitored, e.g. the memory bandwidth is assessed against the threshold following each instance of monitoring the memory bandwidth. Thus, in an embodiment, the memory bandwidth is assessed at a faster rate than the rate at which source frames in the sequence of source frames are encoded (i.e. the memory bandwidth is assessed multiple times per frame), e.g., for each group of a plurality of blocks of a source frame being encoded (when the source frame is divided into blocks of pixel data for the purposes of encoding).

When the memory bandwidth is assessed against the threshold (and, e.g., the memory bandwidth is monitored) at a rate that is faster than that at which source frames are encoded (e.g. for each of a group of a plurality of blocks), in an embodiment, the target memory bandwidth usage (when using one or more reference frames when encoding a source frame) for a source frame is divided, e.g. pro rata, between each instance of the memory bandwidth being assessed, e.g. between each group of a plurality of blocks. In these embodiments it is thus this divided up target memory bandwidth on which the threshold is based, e.g. the threshold may simply be the divided up target memory bandwidth (though as discussed below, this may not always be the case).

The threshold(s) and/or the target memory bandwidth per source frame may be set, e.g. selected or pre-defined, in any suitable and desired way. In one embodiment the threshold(s) and/or the target memory bandwidth are set as one or more input parameters. When a target memory bandwidth per source frame for encoding a source frame as a whole is set, in an embodiment, the threshold(s) is determined by subtracting known and/or estimated memory bandwidths (e.g. of the input frame and/or the output bitstream) from the target memory bandwidth for encoding a source frame as a whole. This may involve the intermediate step of determining a target memory bandwidth when using one or more reference frames when encoding a source frame (e.g. by subtracting these known and/or estimated memory bandwidths) from which the threshold(s) may be determined. This target reference frame memory bandwidth or threshold(s) may then be divided up, e.g. between blocks of the source frame being encoded, as described above. In an embodiment, the threshold(s) are set at a level below the target reference frame memory bandwidth, e.g. to try to prevent the memory bandwidth reaching or exceeding this limit.

The input parameter(s) may be set by any suitable and desired part of the apparatus, or a component external to the apparatus. For example, the input parameter(s) could be set by the application that is controlling the video generation and/or encoding (e.g. that is executing on a host processor of the system) and/or by a driver for the video encoder (processor). However, in an embodiment the input parameter(s) are set by (e.g. firmware running on) the monitoring and/or control circuitry. The (e.g. firmware running on the) the monitoring and/or control circuitry may determine the system requirements and/or capabilities and set the input parameter(s) accordingly, e.g. using the target memory bandwidth (which itself, although may be an input parameter, is, in an embodiment, set externally to the processing circuitry of the apparatus, e.g. by a driver or a video data processing system comprising the apparatus, and not by the firmware) as discussed above.

When the target memory bandwidth per source frame is set as an input parameter (and, e.g., when a source frame is divided into blocks of pixel data for the purposes of encoding), in an embodiment, the method comprises (and the (e.g. firmware running on the), e.g., monitoring circuitry and/or control circuitry is configured to) determining the threshold(s) (e.g. per block, per group of a plurality of blocks or per row) against which the monitored memory bandwidth is to be assessed, e.g. pro rata as discussed above.

Furthermore, when the memory bandwidth is monitored and/or the monitored memory bandwidth is assessed against the threshold(s) a plurality of times for a source frame being encoded (i.e. at a faster rate than the rate at which source frames in the sequence of source frames are encoded), the number of times for (e.g. the rate at) which the memory bandwidth is monitored and/or the monitored memory bandwidth is assessed against the threshold(s) may be set as an input parameter or set (e.g. determined) by (e.g. firmware running on the) monitoring circuitry. When a source frame is divided into blocks of pixel data for the purposes of encoding, and the memory bandwidth is monitored and/or the monitored memory bandwidth is assessed against the threshold for each group of a plurality of blocks of the source frame being encoded, the size of the group of a plurality of blocks (e.g. the number of blocks or rows of blocks) may be set as an input parameter or set (e.g. determined) by (e.g. firmware running on the) monitoring circuitry.

The various input parameters discussed above may be set at any suitable and desired point with respect to the encoding of the sequence of source frames, e.g. by the appropriate (e.g. firmware running on the) processing circuitry. In an embodiment, the input parameters are set (e.g. selected or pre-defined) before a stream of input frame data (representing a sequence of source frames) is to be encoded. Furthermore, these input parameters may be changed between different streams of input frame data (representing different sequences of source frames) to be encoded.

As discussed above, when a source frame is encoded in a blockwise fashion, the memory bandwidth may be monitored (and then the threshold(s) may be assessed) over a plurality of blocks of the source frame, to help to avoid taking unnecessary action for a short-lived spike in the memory bandwidth usage when encoding only a limited number of blocks of the source frame. In another embodiment such a hysteresis may be implemented by setting a tolerance for the threshold(s). Thus, for example, the tolerance may be set at a level that is greater (e.g. by a selected amount) than the pro rata value (e.g. per block, per group of a plurality of blocks, per row) of the target (reference frame) memory bandwidth for the frame. This may allow the memory bandwidth usage to rise above the pro rata value (but not as much as the threshold(s)) by a limited amount, such that restrictions are not placed on the memory bandwidth usage for only a small rise above the pro rata value, but when the memory bandwidth usage is greater than a threshold, action is taken. As before, the tolerance for the threshold(s) may be set as an input parameter.

When the monitored memory bandwidth is greater than a threshold, the video encoding process may be modified in any suitable and desired way for encoding a subsequent part of a source frame, in order to restrict the memory bandwidth usage when using one or more reference frames when encoding the subsequent part of the source frame. In an embodiment, the modified video encoding process uses the same video encoding format (as used for encoding the previous part of the source frame when the memory bandwidth was lower than the threshold) but, e.g., with a modified set of encoding parameters, as will be described below. Thus, for example, when the video encoding format used to encode the previous part of the source frame is VP9, then, in an embodiment, the video encoding format used to encode the subsequent part of the source frame is also VP9 (but, e.g., with modified encoding parameters).

In an embodiment the type of a source frame for the purposes of encoding does not change when the subsequent part of the source frame is encoded using the modified encoding process. Thus, for example, when a source frame is an intra-frame (I-frame), a predicted frame (P-frame) or a bi-directionally predicted (B-frame) for the purposes of encoding, it remains this same type of frame even when the subsequent part of the source frame is encoded using the modified encoding process.

In one embodiment the modified video encoding process places a restriction on the number of reference frames that are to be used when encoding a subsequent part of a source frame. This may help to reduce the number of reference frames that are used when encoding the subsequent part of the source frame, which in turn helps to reduce the memory bandwidth being used when using these reference frames. Depending on the number and nature of the reference frames being used to encode a source frame and how these are restricted in number, such a restriction may have a large effect in helping to reduce the memory bandwidth.

The restriction placed on the number of reference frames that are to be used when encoding a subsequent part of a source frame may be a maximum limit on the number of reference frames, a selected number of reference frames or a reduced number of reference frames (e.g. compared to the number used when encoding the previous part of the source frame). For example, embodiments of the modified video encoding process may allow up to 2, 1 or 0 reference frames to be used when encoding the subsequent part of the source frame.

Therefore, for example, one of these values may be selected as the number of reference frames to use when encoding a subsequent part of a source frame, used as a maximum limit for the number of reference frames to use or the number of reference frames being used may be reduced by a selected number of frames. When multiple thresholds for the memory bandwidth usage are being used, the modified video encoding process may use a different restriction for the number of reference frames that are to be used when encoding the subsequent part of the source frame for each of the thresholds, e.g. in order to implement different restrictions at the different thresholds.

It will be appreciated that when encoding a source frame, e.g. in a blockwise manner, only part of (e.g. a region of) each of one or more reference frames may be used (and thus, e.g., read by the encoding circuitry) in the encoding. This may particularly be the case when blocks of a source frame are encoded individually. As will be discussed below, in some embodiments, a region of each reference frame (which is smaller than the whole of the respective reference frame) may be used to search for the corresponding part (e.g. block) of the source frame being encoded, e.g. for the purposes of motion estimation.

Thus, in one embodiment, the modified video encoding process places a restriction on the size of an area of one or more reference frames that is to be searched when encoding a subsequent part of a source frame using one or more reference frames (e.g. for the purposes of identifying corresponding block(s) in reference frame(s) to use for the differential encoding of blocks in a source frame during the motion estimation process). This may help to reduce the search area used for each of the reference frames when encoding the subsequent part of the source frame, which in turn helps to reduce the memory bandwidth being used when using these reference frames. Although this restriction may have a lesser effect than a restriction on the number of reference frames to be used for encoding the source frame, it may still be useful in helping to reduce the memory bandwidth.

The restriction placed on the size of the area of one or more reference frames that is to be searched when encoding a subsequent part of a source frame may be a maximum limit on the size of the search area, a selected search area or a reduced search area (e.g. compared to the search area used when encoding the previous part of the source frame). It will be appreciated that in general the smaller the area of the one or more reference frames that is to be searched, the greater the restriction on the memory bandwidth. Thus, for example, when multiple thresholds for the memory bandwidth usage are being used, the modified video encoding process may use a different restriction for the size of the search area of the one or more reference frames that is to be used when encoding the subsequent part of the source frame for each of the thresholds, e.g. in order to implement different restrictions at the different thresholds.

In one embodiment the search of one or more reference frames during the motion estimation process is performed in a, e.g., two-step approach, e.g. as described in the Applicant's application US-A1-2016/0366408. In an embodiment, first (e.g. an area of) a lower resolution, e.g. downsampled, version of the one or more reference frames is searched to determine the region of the frame which includes the part corresponding to the part of the source frame being encoded. This region of a higher resolution version of the one or more reference frames (e.g. the full resolution reference frames) may then be used (e.g. loaded from the cache) to perform a more detailed search, so that the part of the one or more reference frames corresponding to the part of the source frame being encoded can be determined for the purposes of motion estimation.

When two (or more) versions of one of more reference frames are used in this manner, and a restriction is placed on the search area of the one or more reference frames, in an embodiment, the restriction is (at least) placed on the search area of the higher resolution reference frames, as this may provide a greater restriction on the memory bandwidth owing to the higher resolution.

In one embodiment the modified video encoding process places a restriction on the position of the area in each of one or more reference frames that is to be searched when encoding a subsequent part of a source frame using the one or more reference frames. In an embodiment, the position is restricted compared to the position of the area in each of the one or more reference frames that were searched when encoding the previous part of the source frame using the one or more reference frames. For example, the area in each of the one or more reference frames that is to be searched when encoding the subsequent part of the source frame may be restricted to be at least partially overlapping with the area of the one or more reference frames that is to be searched when encoding the previous part of the source frame or may be restricted to be displaced from the area of the one or more reference frames that is to be searched when encoding the previous part of the source frame by a maximum distance. Restricting the position of the search area in the one or more reference frames when encoding the subsequent part of the source frame may help to reduce the memory bandwidth being used when using these reference frames because it increases the likelihood that at least part of the search area may have been used previously and thus may, e.g., be present already in the cache and thus may not need to be retrieved from (e.g. off-chip) memory.

The position of the area of one or more reference frames that is to be searched when encoding a subsequent part of a source frame may be determined in any suitable and desired way. In one embodiment a motion vector used when encoding a previous part of a source frame is used to determine the position of the area of one or more reference frames that is to be searched when encoding a subsequent part of the source frame, e.g. to limit the displacement of the search area.

When a source frame is divided into blocks of pixel data for the purposes of encoding, with the blocks of the source frame being encoded using corresponding blocks in one or more reference frames, in an embodiment, the position of the area in each of the one or more reference frames that is to be searched when encoding the subsequent part (e.g. block(s)) of the source frame is restricted compared to the position of the block(s) in each of the one or more reference frames that were searched when encoding the previous part of the source frame using the one or more reference frames, e.g. using the motion vector(s) for these block(s).

The restriction placed on the position of the area in each of one or more reference frames that is to be searched when encoding a subsequent part of a source frame may be a maximum limit (e.g. relative displacement or (lack of) overlap) on the position of the search area, a selected position (e.g. relative displacement or overlap), or a reduced relative displacement or increased overlap of the search area (e.g. compared to the search area used when encoding a previous part of the source frame). It will be appreciated that in general the smaller the change in search area of the one or more reference frames from one part (e.g. block) of the source frame to the next, the greater the restriction on the memory bandwidth. Thus, for example, when multiple thresholds for the memory bandwidth usage are being used, the modified video encoding process may use a different restriction for the position of the search area of the one or more reference frames that is to be used when encoding the subsequent part of the source frame for each of the thresholds, e.g. in order to implement different restrictions at the different thresholds.

As discussed above, different levels of a particular type of restriction (e.g. the number of reference frames used or the size of the search area) may be implemented at different thresholds, when multiple thresholds are used. In one embodiment, different types of restrictions are used at the different thresholds (e.g. as well as or instead of different levels of the same type of restriction, or any combination thereof). This may depend on the severity of the restriction that is suitable and desired to be implemented for the memory bandwidth.

For example, when the memory bandwidth is greater than a first threshold, a first restriction (e.g. on the size of the search area to be used) may be implemented. When the memory bandwidth continues to rise, e.g. such that it is greater than a second threshold, a second (e.g. more severe) restriction (e.g. on the number of reference frames to be used) may be implemented to restrict the memory bandwidth further. This allows the restriction on the memory bandwidth to be varied, e.g. in response to the size of the memory bandwidth being used.

The modified video encoding process(es) may be implemented (e.g. by the encoding circuitry) in any suitable and desired way. In an embodiment the (e.g. each) modified video encoding process uses a modified set of encoding parameters (compared to the encoding parameters used when encoding a previous part of a source frame), when the monitored memory bandwidth is greater than a threshold. The encoding parameters determine how a source frame is to be encoded and thus, in an embodiment, the modified set of encoding parameters determines how the encoding process is modified (e.g. by the encoding circuitry), e.g. to implement one or more of the restrictions discussed above. For example, the modified set of encoding parameters may indicate (e.g. to the encoding circuitry) how many reference frames to use, the size of the search area to use and/or the position of the search area to use, when encoding a subsequent part of a source frame.

In the embodiments that may use multiple different modified video encoding processes, e.g. owing to having multiple different memory bandwidth usage thresholds, each different video encoding process may use a different respective set of video encoding parameters. This helps to allow each different video encoding process to implement different memory bandwidth usage restrictions.

The encoding parameters (e.g. both for original video encoding process and for the (e.g. each) modified video encoding process) may be set in any suitable and desired way, and by any suitable and desired part of the apparatus, or a component external to the apparatus. For example, the encoding parameters could be set by an application (e.g. that controls the video generation and/or encoding). However, in an embodiment the encoding parameters are set by (e.g. firmware running on) the control and/or encoding circuitry. The (e.g. firmware running on the) the control and/or encoding circuitry may determine the system requirements and/or capabilities and set the encoding parameters accordingly.

In one embodiment the method comprises (and the control circuitry is configured to control the encoding circuitry to) encoding a subsequent part of the source frame using a set of modified encoding parameters (when (in response to) the monitored memory bandwidth is greater than a threshold). Thus, in an embodiment, the (e.g. firmware running on the) control circuitry is configured to control the encoding circuitry to read a set of modified encoding parameters, e.g. as provided by firmware.

It will be appreciated that as a modified video encoding process may be implemented using a set of modified video encoding parameters, in an embodiment, the restriction to the memory bandwidth is not a physical restriction on the amount of data being transferred (i.e. when using one or more reference frames) but rather a restriction on the set of data (e.g. the fields of data) that are available to be used (from the one or more reference frames) by the modified video encoding process. Thus, in an embodiment, the modification to the video encoding process restricts the choice of data from the one or more reference frames that is able to be used when encoding a subsequent part of a source frame.

Normally it would be expected that the implementation of the modified video encoding process restricts and generally reduces the memory bandwidth usage when using reference frames for encoding a source frame (e.g. compared to when the original video encoding process were to be continued to be used without modification).

However, the modified video encoding process may not (in some circumstances) lead to a direct or immediate reduction of the memory bandwidth usage when using reference frames in the encoding of a subsequent part of a source frame. For example, although a modified video encoding process may result in a (e.g. set of) reference frame data being restricted (e.g. owing to the encoding parameters being used), the memory bandwidth being used when using reference frame(s) to encode a subsequent part of a source frame may not reduce owing to the amount (e.g. density) of reference frame data (e.g. in the restricted set thereof) in the part of the reference frame(s) being used in the encoding.

In this case, as discussed above, in an embodiment, the memory bandwidth usage is further monitored and the video encoding process being used is further modified to impose further restrictions on the memory bandwidth usage, e.g. until the memory bandwidth usage reduces.

In an embodiment, when the monitored memory bandwidth is greater than a threshold, a subsequent part of a source frame is encoded using a modified set of encoding parameters. In an embodiment, the method comprises (and the (e.g. firmware running on the) control circuitry is configured to) modifying the set of encoding parameters for use in encoding the subsequent part of the source frame, when the monitored memory bandwidth is greater than the threshold (and then encoding the subsequent part of the source frame using the modified set of encoding parameters). As outlined above, the encoding parameters may be modified by the (e.g. firmware running on the) control circuitry controlling the encoding circuitry to read a set of modified encoding parameters, which themselves have been set or determined by, e.g., the (e.g. firmware running on the) control circuitry.

The modified video encoding process may be used to encode any suitable and desired subsequent part of a source frame being encoded. In one embodiment the modified video encoding process is used for encoding a subsequent part of a source frame until the memory bandwidth (being used when using one or more reference frames) falls below a lower threshold (e.g. a threshold representing a lower memory bandwidth usage than the threshold at which the modified video encoding process was implemented). When the memory bandwidth being used falls below a lower threshold, in an embodiment, the original video encoding process is used for encoding a subsequent part of a source frame being encoded.

Thus it will be seen that a modified video encoding process is implemented when the memory bandwidth usage exceeds a (e.g. upper) threshold and may be reverted back to the original video encoding process when the memory bandwidth usage falls below a (e.g. lower) threshold that is below the (e.g. upper) threshold used to implement the modified video encoding process, e.g. to introduce a hysteresis so that changes to the video encoding process are not made unnecessarily quickly.

The restriction on the memory bandwidth may be maintained only for the particular source frame being encoded (assuming, for example, that the memory bandwidth usage restriction is not lifted). However, in an embodiment, the modified encoding process is used for encoding subsequent source frames to be encoded in the sequence of source frames, e.g. as for long as the memory bandwidth does not fall below a lower threshold (this may be particularly important when the encoding of the source frames and thus the encoding circuitry is split across multiple processing cores).

Thus, as outlined above, the restriction on the memory bandwidth may be lifted or, e.g., reduced (e.g. when there are multiple different modified video encoding processes available to be used), when it is determined appropriate to do so, e.g. when the memory bandwidth being used falls below a lower threshold. Thus, in an embodiment the method comprises:

when encoding a (e.g. subsequent part of a) source frame of the sequence of source video frames using a modified video encoding process that uses one or more reference frames derived from one or more other source frames in the sequence of source frames, monitoring the memory bandwidth being used when using the one or more reference frames when encoding the source frame; and when the monitored memory bandwidth falls below a (lower) threshold:

encoding a subsequent part of the source frame using the (original) video encoding process (i.e. to lift the restriction on the memory bandwidth being used when using the one or more reference frames when encoding the subsequent part of the source frame).

Thus, when the restriction on the memory bandwidth is implemented (by encoding the next part of a source frame using the modified encoding process), in an embodiment, the memory bandwidth is continued to be monitored and then, when the monitored memory bandwidth falls below a lower threshold, the restriction on the memory bandwidth is lifted or reduced by returning to encode the source frame using the original video encoding process that was being used before the restriction was imposed. Thus, in an embodiment, the modified video encoding process is used for encoding the subsequent part of the source frame until at least the next time at which the monitored memory bandwidth is assessed against the threshold (with the restriction being lifted when the monitored memory bandwidth is assessed to be below the lower threshold and, e.g., the restriction otherwise maintained).

The lower threshold, as for the initial (upper) threshold, for the monitored memory bandwidth may be any suitable and desired level. Thus, in an embodiment, the lower threshold is selected, e.g. pre-defined, e.g. before each stream of input frame data (representing a sequence of source frames) is encoded. The lower threshold may be the same as the first threshold, i.e. such that the memory bandwidth restriction is imposed when the memory bandwidth is greater than the threshold and lifted (or reduced) when the memory bandwidth falls below the threshold. However, in an embodiment, the lower threshold represents a memory bandwidth usage of reference frame(s) that is less than the upper threshold. This helps to introduce a hysteresis, to avoid making unnecessary short-term changes to the video encoding process owing to a short-lived drop in the memory bandwidth. Instead, in this embodiment, the memory bandwidth being used has to reduce to a level below the first threshold before the memory bandwidth restrictions are lifted or reduced.

As with the initial(upper) threshold, in an embodiment, the lower threshold is (e.g. selected) based on a target memory bandwidth usage for encoding a source frame as a whole, e.g. from which a target memory bandwidth when using one or more reference frames when encoding a source frame may be derived. When the memory bandwidth is assessed against the lower and upper thresholds (and, e.g., the memory bandwidth is monitored) at a rate that is faster than that at which source frames are encoded (e.g. for each of a group of a plurality of blocks), in an embodiment, the lower threshold is less than the mean average of the target memory bandwidth usage (when using one or more reference frames when encoding a source frame) for each instance of the memory bandwidth being assessed for a source frame, e.g. less than the pro rata value, e.g. between each group of a plurality of blocks. Thus, in an embodiment, the first (upper) threshold has a (e.g. selected) value above the pro rata value for the source frame of the target reference frame(s) memory bandwidth and the lower threshold has a (e.g. selected) value below the pro rata value for the source frame of the target reference frame(s) memory bandwidth.

As with the embodiment in which there are multiple upper thresholds, in one embodiment there may be multiple lower thresholds, e.g. corresponding to the respective upper thresholds. Thus, in one embodiment the memory bandwidth restriction imposed by a particular upper threshold is lifted by the corresponding lower threshold (and the encoding of a subsequent part of a source frame returned to the encoding process being used before that restriction was imposed).

When there are (e.g. multiple) lower and upper thresholds, in an embodiment, the memory bandwidth being used (when using one or more reference frames when encoding a source frame) is monitored (e.g. repeatedly) after a restriction on the memory bandwidth is imposed and when the memory bandwidth being used is assessed to be below a lower threshold any restriction previously imposed is lifted or reduced to a different restriction, as appropriate, and when the memory bandwidth is assessed to be higher than an upper bandwidth the appropriate restriction is (re-)imposed. This helps to maintain the memory bandwidth at a reasonably predictable level.

Such multiple upper and lower thresholds may be implemented in any suitable and desired way. For example, by continuously monitoring the memory bandwidth being used when using reference frames in the encoding (e.g. after a memory bandwidth usage restriction has been imposed), the restrictions (i.e. the different modified video encoding processes) may be increased or decreased progressively (e.g. iteratively), as appropriate depending on the memory bandwidth usage. Thus, the continuous monitoring of the memory bandwidth usage provides feedback as to the restriction that any particular modified video encoding process is implementing.

The different processing circuitry (e.g. the encoding, control and monitoring circuitry) of the apparatus of the technology described herein may be provided in any suitable and desired way, e.g. as fixed function and/or programmable processing circuitry.

The apparatus may have a single processor (e.g. a single processing core) that receives and encodes the input video image data, e.g. one (e.g. block of) source frame at a time, e.g. in raster scan order. Thus, this single processor may comprise the encoding, control and/or monitoring circuitry of the apparatus, e.g. as fixed function and/or programmable circuitry.

However, in an embodiment the apparatus (and thus the processing circuitry) comprises a plurality of processing cores ((e.g. each) comprising at least part of the encoding, control and/or monitoring circuitry of the apparatus). Therefore, in an embodiment, the method is performed on a plurality of processing cores. The plurality of processing cores may implement the method using fixed function and/or programmable circuitry.

When the apparatus comprises a plurality of processing cores, in an embodiment, a source frame to be encoded is divided up between the plurality of processing cores, e.g. in any suitable and desired way, such that each processing core encodes a portion of the source frame (e.g. independently). For example, each processing core may encode different blocks of a source frame separately. In an embodiment, a source frame to be encoded is divided up into a plurality of (e.g. horizontal) slices, with each slice of the source frame being encoded by one of the processing cores. In an embodiment, each slice of the source frame comprises one or more rows of the source frame, and, in an embodiment, each row comprises a plurality of blocks of video image data.

When the method is performed on (and the apparatus comprises) a plurality of processing cores, the monitoring and/or subsequent modifying of the video encoding process (when necessary) may be implemented by the processing cores in any suitable and desired way. The plurality of processing cores may be configured to each implement the method of the technology described herein individually, e.g. with each processing core determining the (e.g. modified) video encoding process to use depending on its own (individual) memory bandwidth usage. However, in an embodiment, the plurality of processing cores implement the method of the technology described herein collectively. This helps to provide deterministic encoding of the sequence of source frames.

Thus, in an embodiment, each of the processing cores uses the same measure for the (e.g. total) monitored memory bandwidth, e.g. so that the method of the technology described herein is implemented collectively by the plurality of processing cores. This facilitates a deterministic output bitrate for the encoding of the video image data for the sequence of source frames, e.g. because the different processing cores are sharing the threshold, e.g. the total target memory bandwidth for a source frame, and the processing cores are, in an embodiment, modifying the video encoding process using the same information (the monitored memory bandwidth).

In an embodiment, the plurality of processing cores are each configured to implement the processing circuitry of the apparatus and thus, in an embodiment, the plurality of processing cores are configured to encode multiple (e.g. blocks of) source frames in parallel.

When the method is performed on (and the apparatus comprises) a plurality of processing cores, in an embodiment, the method comprises monitoring the memory bandwidth being used when using one or more reference frames when encoding a source frame for all of the processing cores being used for encoding the source frame, e.g. using the accesses by the cache to the memory for each processing core. Thus, in an embodiment, each processing core comprises a cache counter (e.g. an accumulator) for determining the number of accesses by the cache to the memory for (e.g. part or blocks of) one or more reference frames used when encoding a source frame. This helps to allow the memory bandwidth being used (e.g. the number of accesses by the cache to the memory) to be monitored separately and then, e.g. read by firmware in a pipelined fashion. This helps to avoid the monitoring of the memory bandwidth being timing dependent because the firmware is able to read the cache counter for one block while another block is being processed.

In one embodiment, e.g. even when the method is performed on (and the apparatus comprises) a single processing core, multiple cache counters (e.g. accumulators) may be provided for each processing core. For example, when a source frame is divided into blocks of pixel data for the purposes of encoding, multiple cache counters may be provided and used, e.g. one for each (e.g. 64×64) block to be encoded. This may allow a block to be encoded (and its reference frame memory bandwidth to be monitored using a cache counter for the block) and the monitored reference frame memory bandwidth to be stored by the cache counter for that block, and then a subsequent block to be encoded (and its reference frame memory bandwidth to be monitored using a different cache counter for this block) while the monitored reference frame memory bandwidth for the previous block is read out (e.g. by firmware). Thus, the monitoring circuitry, e.g. the cache counters, may comprise one or more registers (e.g. a register for the reference frame memory bandwidth of a block currently being encoded and a register for the reference frame memory bandwidth of a block previously encoded).

Although, in an embodiment, each of the processing cores uses the same measure for the monitored memory bandwidth usage, individual processing cores may modify the video encoding process being used to encode the respective part of the source frame differently and, e.g., independently from other processing cores. This may, for example, depend on the particular video encoding process that a particular processing core is using when encoding its part of the source frame. As will be appreciated, this may differ between different processing cores owing to the different parts of the source frame being encoded by the different processing cores, or even the different parts of different source frames being encoded contemporaneously by the different processing cores (in a multi-core operation the encoding of multiple different source frames may overlap).

The (e.g. total) monitored memory bandwidth may be determined (e.g. calculated) in any suitable and desired way when there are a plurality of processing cores. In an embodiment, the monitored memory bandwidth is determined for a (e.g. selected) period of time (e.g. the total number of accesses by the cache to the memory by all the processing cores in the period of time). As before, e.g. with a single processing core, the memory bandwidth may be determined for each or a plurality of blocks (e.g. row(s)) of a source frame.

When the monitored memory bandwidth (e.g. the total monitored memory bandwidth for all the processing cores) is greater than a threshold, in an embodiment, the method comprises each processing core encoding a subsequent part of a source frame using a modified video encoding process to restrict the memory bandwidth being used when using one or more reference frames when encoding the subsequent part of the source frame.

In embodiments, the apparatus or system may comprise, and/or may be in communication with, one or more memories and/or memory devices that store the data described herein, and/or store software for performing the processes described herein. The apparatus or system may comprise, and/or may be in communication with a host microprocessors, and/or display for displaying images based on the data elements of the frames, or a video processor for processing the data described above. The apparatus or system may comprise, and/or may be in communication with a video camera that generates the frames of video image data.

The technology described herein may be implemented in any suitable video processing system, such as a suitably configured micro-processor based system. In an embodiment, the technology described herein is implemented in a computer and/or micro-processor based system. In an embodiment, the technology described herein is implemented in (or as) a video encoder and/or processor (and decoder where necessary).

The system may include any suitable and desired components or elements to allow the operation in the manner of the technology described herein, such as, for example, a rendering unit (to which any output (decoded) video image data is provided, e.g. from a decoder) for rendering, an output, e.g. a display, to which the rendered frames of video are provided from the rendering unit, and memory for storing the data that is required (such as the unencoded video data, the consequent encoded data blocks and the consequent output (decoded) video data).

When the encoded video image data has been produced (e.g. as a bitstream of the encoded data), it may then be handled as desired for future use, e.g. output, in an embodiment, as an encoded stream of video image data, e.g. by being suitably stored and/or by being transmitted to a decoder for decoding. In an embodiment, any encoding parameters used for encoding the video image data (e.g. when using the original and/or modified video encoding processes) are also output, in an embodiment, in the same encoded stream of video image data. The decoder may then subsequently decode the encoded video data, e.g. in any suitable and desired way (e.g. using the encoding parameters provided), to provide a sequence of video frames. In an embodiment, the decoded video data (frames) are then output, e.g., stored and/or displayed.

Thus, in an embodiment, the method comprises (and the encoding processing circuitry is configured to) outputting an encoded stream of video image data (i.e. the encoded source frames). In an embodiment, the method comprises (and the apparatus or a video processing system (comprising the apparatus) comprises decoding circuitry configured to) decoding the encoded stream of video image data (e.g. using the appropriate video decoding process corresponding to the video encoding process(es) used) to provide decoded video image data (i.e. the sequence of source frames). In an embodiment, the method comprises (and the apparatus or a video processing system (comprising the apparatus) comprises a display configured to) displaying the decoded video image data.

The various functions of the technology described herein may be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., when desired.

Subject to any hardware necessary to carry out the specific functions discussed above, the video processor can otherwise include any one or more or all of the usual functional units, etc., that video encoders, decoders, and processors include.

It will also be appreciated by those skilled in the art that all of the described embodiments of the technology described herein may, and in an embodiment do, include, as appropriate, any one or more or all of the features described herein.

The methods of the technology described herein may be implemented at least partially using software, e.g. computer programs. Thus, further embodiments of the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier may be a physical storage medium such as a ROM chip, CD ROM, RAM, flash memory or disk.

It will further be appreciated that not all steps of the methods of the technology described herein need be carried out by computer software and thus in further embodiments technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, RAM, flash memory, or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic or optical. It is contemplated that such a computer program product may be distributed as a removable medium with accompanying printed or electronic documentation, for example, shrink wrapped software, pre-loaded with a computer system, for example, on a system ROM or fixed disk.

Embodiments of the technology described herein will now be described in the context of encoding frames of video image data.

FIG. 1 shows a system 1 for encoding (and decoding) video image data in an embodiment of the technology described herein, i.e. that will typically be used to encode (and decode) video image data.

The video encoding and decoding system 1 shown in FIG. 1 includes a device 2 (e.g. a video camera) that generates and then encodes video image data. The encoded video image data is then transmitted (streamed) over a, e.g. wireless, link 4 (e.g. the internet) to a, e.g. remote, device 3 (e.g. a mobile telephone) that decodes the encoded video image data and displays the decoded video image data.

Video encoding formats (such as VP9 and HEVC) can enable a significant reduction in the file size of the video image data for transmission (which thus aids the efficient streaming of the video image data) without a significant visible loss of image quality when the video images are viewed.

The video image data is typically generated by the video generating device 1 as a sequence of frames. In "differential" video coding standards (such as VP9 and HEVC), most of the "source" frames in the sequence of frames to be encoded are encoded with respect (reference) to a "reference" frame (or frames) (typically a previously encoded source frame in the sequence of frames).

In some encoding schemes (e.g. VP9), this differential encoding is done by dividing each frame of video image data into a plurality of rectangular blocks of pixels of the frame, with each block being encoded and decoded individually. A given block of data may have an associated motion vector that points to a corresponding block of data in a reference frame, and a residual that describes the differences between the data in the current data block and the data in the reference frame. (This thereby allows the video data for the block of the (current) frame to be constructed from the encoded video data pointed to by the motion vector and the difference data describing the differences between that block and the block of the current video frame.)

Figure 2:
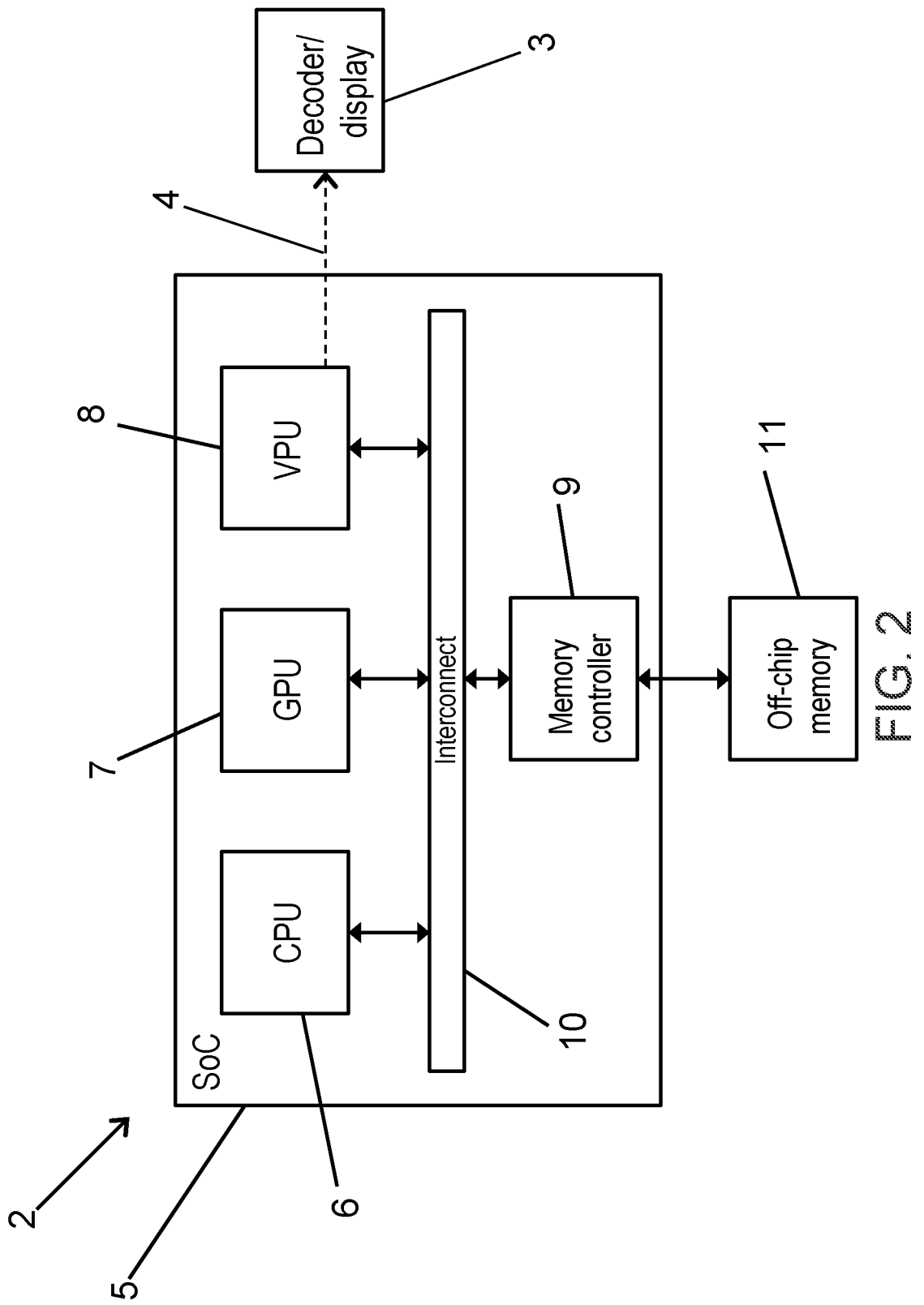

FIG. 2 shows schematically the system 1 for encoding (and decoding) video image data in an embodiment of the technology described herein in more detail. This shows a more detailed view of the video generating and encoding device 2, as well and the decoding and display device 3 shown in FIG. 1.

As shown in FIG. 2, the video generating and encoding device 2 comprises a system on-chip (SoC) 5 which includes a host CPU 6, a GPU 7, a video processing unit (video engine) 8 and a memory controller 9, that communicate via an interconnect 10, all having access to off-chip memory 11. Separate to the SoC 5 and off-chip memory 11 is the decoding and display device 3, which is connected to the video generating and encoding device 2 by the transmission link 4.

The GPU 7 (or alternatively a different video frame generator (e.g. a video camera or image signal processor)) generates and/or provides a sequence of frames video image data for encoding, and the VPU 8 encodes the sequence of frames of video image data.

As will be appreciated by those skilled in the art, the video generating and encoding device 2 and the decoding and display device 3 may include other elements and components not shown in FIG. 2. FIG. 2 simply shows those elements and components of the video generating and encoding device 2 and the decoding and display device 3 that are relevant to the operation of the present embodiments in the manner of the technology described herein.

In the present embodiments, a frame to be displayed is generated as desired by, for example, being appropriately rendered by the GPU 7 and then encoded by the VPU 8. The encoded frame is then stored in a compressed form in a frame buffer within the off-chip memory 11, so that it may be transmitted via the transmission link 4 to the decoding and display device 3, or used by the VPU 8 in the differential encoding of subsequent source frames.

Figure 3:
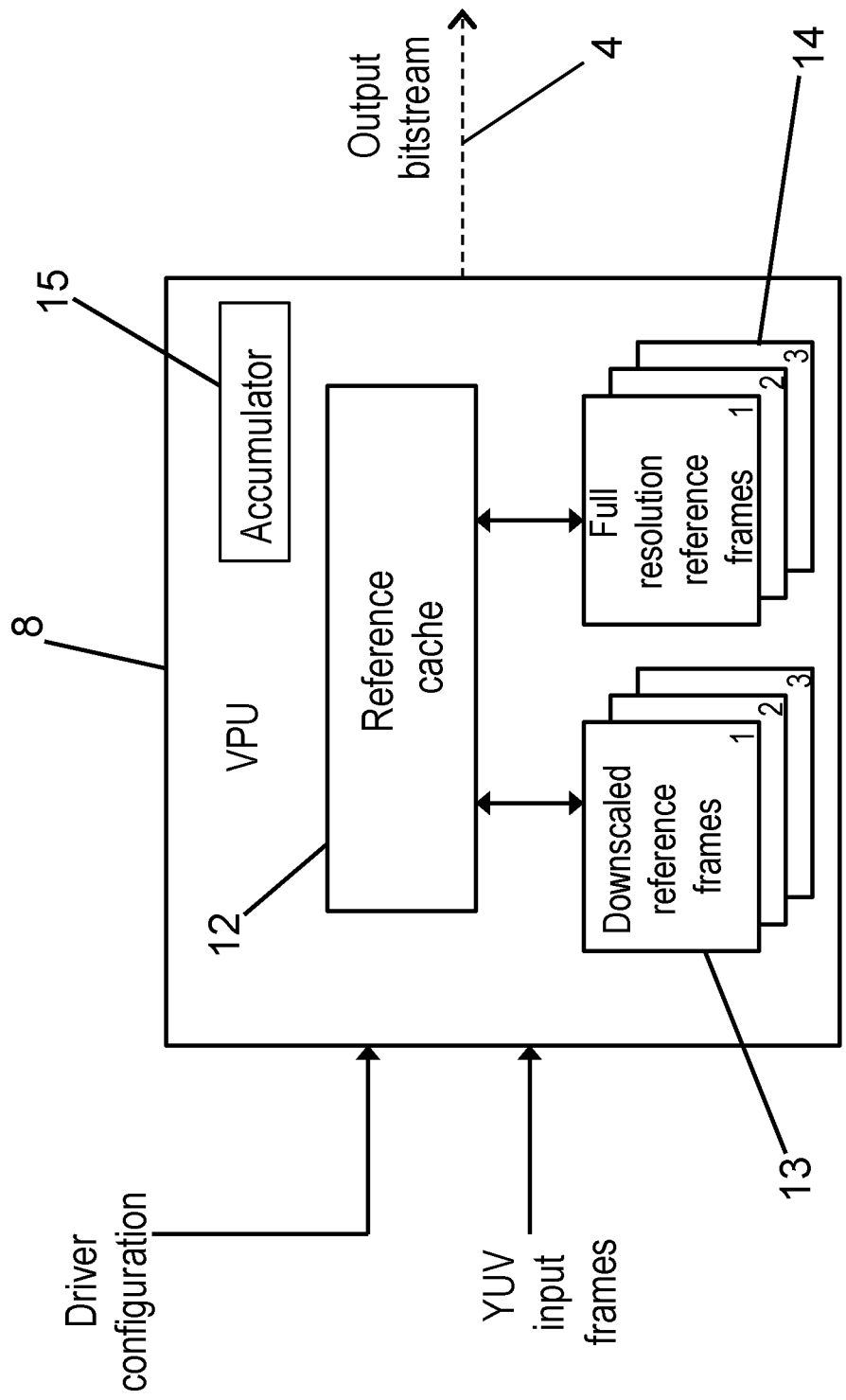

FIG. 3 shows schematically the VPU 8 for encoding video image data (as shown in FIG. 2) in an embodiment of the technology described herein in more detail. The VPU 8 comprises a reference cache 12 for storing data of previously encoded reference frames 13, 14 (e.g. that have been retrieved from the off-chip memory 11 (as shown in FIG. 2)), both at a downscaled resolution 13 and at a full resolution 14. The VPU 8 also includes an accumulator 15 configured to monitor the accesses by the reference cache 12 to the off-chip memory 11 when the VPU 8 uses reference frames 13, 14 for encoding source frames.

Although not shown (e.g. for the purposes of clarity), the VPU 8 may include multiple processor cores that are each configured to encode the source frames, such that the multiple processor cores may operate in parallel to encode different blocks of source frames concurrently. Each processor core may therefore include an accumulator 15 configured to monitor accesses by the reference cache 12 to the off-chip memory 11 when the respective processor core uses blocks of reference frames 13, 14 for encoding blocks of source frames.

The VPU 8 receives input source frames of video image data (in the form of YUV values) from the GPU 7 (via the interconnect 10) and driver configuration data (such as the resolution of the frame, the size of the blocks for the encoding, the desired output bitrate for the encoding video image data and the maximum target bandwidth per frame (for encoding a source frame as a whole)) from the CPU 6 (again via the interconnect 10).

The multiple components (and thus processing tasks) of the video generating and encoding device 2 place multiple different demands on the memory bandwidth of the device. The memory bandwidth of the input frame data (representing frames of video image data to be encoded) is fixed by the nature of the input video image data provided and thus cannot be controlled by the video generating and encoding device 2. Although the bitrate of the encoded video image data output is able to be controlled, it is generally significantly less than the input memory bandwidth. However, as will be explained, the memory bandwidth usage when using reference frames in the encoding of source frames can be controlled, in order to provide a more predictable overall memory bandwidth for the system.

Operation of the video generation and encoding device 2 for encoding video image data in an embodiment of the technology described herein will now be described with reference to the flow chart shown in FIG. 4, the graph of the memory bandwidth shown in FIG. 5 and the schematic of how a motion estimate search is performed in FIG. 6, along with the system shown in FIGS. 1 to 3.

Figure 4:
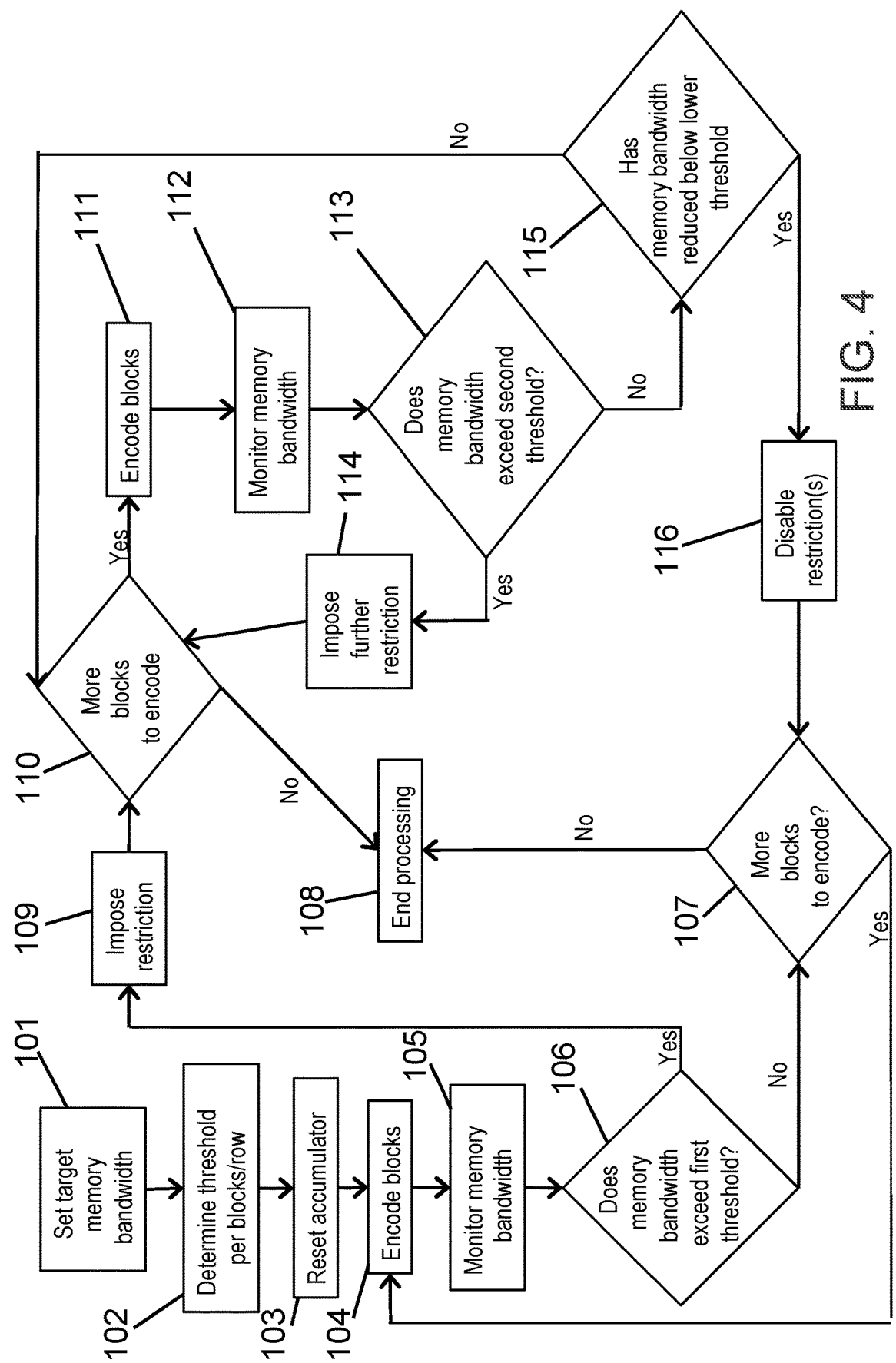
FIG. 4 shows a flow chart of the operation for encoding video image data in an embodiment of the technology described herein.

For a sequence of source frames of video image data to be encoded by the video generation and encoding device 2, the target maximum memory bandwidth usage for encoding a source frame as a whole (in bytes per source frame) is set by (e.g. a driver of) the system (i.e. external to the VPU 8) and is provided by the CPU 6 to the VPU 8, along with other input parameters, e.g. the desired output bitrate, the resolution of the source frames to be encoded and the size of the blocks into which the source frames are to be divided for the purposes of encoding (step 101, FIG. 4).

Firmware running on the VPU 8 then determines the appropriate memory bandwidth threshold(s) to set when using reference frames to encode a group of multiple blocks (e.g. a row) of the source frame (step 102, FIG. 4). The threshold(s), which each represent a level of memory bandwidth usage, are based on the target maximum memory bandwidth usage for encoding a source frame as a whole, the number of blocks over which the memory bandwidth being used is to be monitored and (particularly when there are multiple thresholds) the memory bandwidth usage restriction to be implemented for each threshold, along with other system requirements, capabilities and input parameters.

At the same time, the accumulator 15 is reset (step 103, FIG. 4). Such a reset will typically be performed each time before the video generation and encoding device 2 is used to encode a sequence of source frames.

Once these preliminary steps have been performed, the VPU 8 begins to encode the source frames, which may have been generated by the GPU 7, in a blockwise fashion (step 104, FIG. 4). The video encoding process (e.g. using an encoding format such as VP9 or HEVC) uses a set of encoding parameters (set by the VPU's firmware) which determine the particular way in which blocks of the source frame are to be encoded (e.g. how many reference frames to use, the size of the search area in the reference frame(s) to use and/or the position of the search area in the reference frame(s) to use). The VPU 8 may have multiple processing cores and so different blocks (e.g. rows) of each source frame may be encoded by different cores in parallel. The first frame in the sequence of source frames (as well as ones at the start of a new scene, for example) is typically encoded as an intra-frame (I-frame, i.e. encoded by itself without reference to any other frames), owing to the lack of previously encoded source frames to use as reference frames.

When a source frame has been encoded it is then stored in a compressed form (e.g. as both downscaled and full resolution reference frames 13, 14 as shown in FIG. 3) in a frame buffer within the off-chip memory 11. (Also, once a source frame has been encoded, the output bitstream representing the encoded source frame can be transmitted via a transmission link 4 to a decoding and display device 3.) One or more blocks of a reference frame may subsequently be fetched into the VPU's cache 12 when they are to act as reference frame blocks for subsequent source frame blocks that are encoded.

When a subsequent source frame is encoded (e.g. as a P-frame or a B-frame) using one or more reference frames, the memory bandwidth being used when the VPU 8 reads the one or more blocks of the reference frames 13, 14 from the reference cache 12 (when such one or more blocks are required to be fetched into the cache 12 from the off-chip memory 11) is monitored by the accumulator 15 for each block of the source frame that is encoded (step 105, FIG. 4). Depending on how a given source block is encoded, blocks from the downscaled and/or full resolution versions of the reference frames 13, 14 may be used, e.g. when searching for the corresponding block(s) in the reference frame during the motion estimation process. The accumulator 15 simply determines and stores how many bytes were read during each access by the reference cache 12 to the off-chip memory 11 for each block of the source frame that is encoded (i.e. when the reference blocks to be used were not present initially in the reference cache 12 and thus had to be fetched from the off-chip memory 11).

(When the VPU 8 has multiple processor cores operating, each processor core may have its own accumulator 15 such that the accesses by the reference cache 12 to the off-chip memory 11 may be monitored for each accumulator 15. This enables the number of accesses to be accumulated for each processor core separately (e.g. for each top level (e.g. 64×64) block being encoded)). These accesses can then be reported by the different accumulators 15 to the firmware in a pipelined fashion. Multiple accumulators may be even provided for each processing core, even when the VPU 8 only has a single processing core operating. This enables a processing core to encode a block, monitor and store the accesses by the reference cache 12 to the off-chip memory 11, while the monitored number of accesses for a previous block is being read out and acted on by the firmware.)

Using the monitored memory bandwidth data from the accumulator 15, the VPU firmware calculates the total memory bandwidth (when using the reference frames 13, 14) for a group of multiple blocks of the source frame (e.g. a row in the source frame) and compares this against the threshold that the VPU firmware previously determined from the input parameters (step 106, FIG. 4). When the memory bandwidth for the group of blocks is below the threshold and there are still more blocks of the source frame (or subsequent source frames) to encode (step 107, FIG. 4), these further blocks are encoded (step 104, FIG. 4) with the memory bandwidth being monitored as before for these blocks by the accumulator 15 (step 105, FIG. 4). When there are no more blocks of the sequence of source frames to encode, the encoding of the source frames ends (step 108, FIG. 4) and the encoded bitstream is transmitted by the transmission link 4 to the decoding and display device 3 (although, as will be appreciated, this is often a continuous process such that the encoded bitstream is transmitted as soon as a frame (or blocks thereof) has been encoded and while subsequent blocks and/or frames are being encoded).

Figure 5:
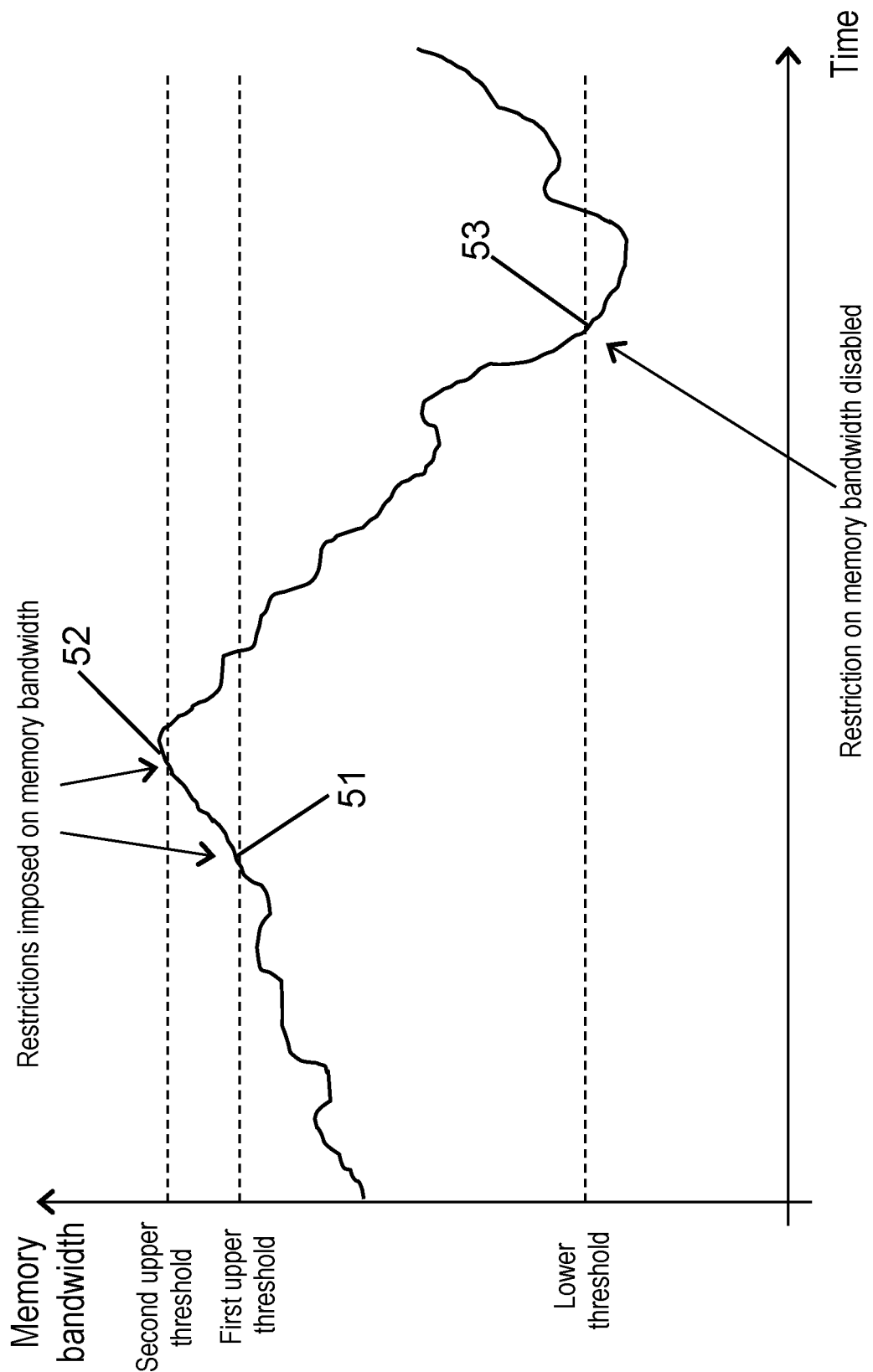
FIG. 5 shows a graph of the memory bandwidth being used when using reference frames during operation of an embodiment of the technology described herein.

If the monitored memory bandwidth is greater than the first threshold (step 106, FIG. 4) for the group of blocks (as shown in FIG. 5 at the point in time 51 when the memory bandwidth exceeds the first upper threshold), the encoding parameters used in the video encoding process to encode subsequent blocks of the source frame are modified (by the VPU firmware) to impose a restriction on the memory bandwidth usage when using the reference frames 13, 14 (step 109, FIG. 4). The modification of the encoding parameters may impose one of the two restrictions shown in FIGS. 6a, 6b, 6c and 6d, as will now be described.

FIGS. 6a, 6b, 6c, and 6d show schematically search procedures involving blocks of video image data that are used in the motion estimation process during operation of embodiments of the technology described herein. FIG. 6a shows four blocks 61, 62, 63, 64 (having IDs 0, 1, 2, 3 respectively) of a source frame to be encoded that are each 32×32 pixels in size (a source frame will typically be much larger than this and therefore contain a much greater number of blocks; only four are shown for the purposes of clarity). During the motion estimation process, which seeks to identify the appropriate block(s) in the reference frame(s) for differentially encoding a block in the source frame, a region of the reference frames 13, 14 is read from the cache 12 by the VPU 8 (this may use a two-step approach, e.g. as described in the Applicant's application US-A1-2016/0366408, which reads in both a downsampled version of the reference frame(s) 13 to determine the blocks of the reference frame that include the block(s) corresponding to the source frame block being encoded and then the corresponding blocks of the full resolution reference frame(s) 14 to determine the particular block(s) in the reference frame that are to be used for encoding the source frame block).

As shown in FIG. 6b, a region 65 (having ID 0) of a reference frame is read by the VPU 8 to search for the corresponding block(s) in the reference frame to be used when encoding the first block 61 (having ID 0) of the source frame. Different regions 66, 67, 68 (having IDs 1, 2, 3 respectively) of the reference frame are read when encoding the other blocks 62, 63, 64 (having IDs 1, 2, 3 respectively) of the source frame. FIG. 6b shows these regions 65, 66, 67, 68 of the reference frame relative to the corresponding blocks 61, 62, 63, 64 of the source frame that are being encoded. It can be seen that the area of the regions 65, 66, 67, 68 of the reference frame are significantly larger than the area of the corresponding blocks 61, 62, 63, 64 of the source frame. The memory bandwidth being used when reading these regions 65, 66, 67, 68 of the reference frame may therefore be relatively larger.

One restriction, imposed by modifying the relevant encoding parameters, is shown in FIG. 6c. This shows the same blocks 61, 62, 63, 64 of the source frame and the same corresponding regions 65, 66, 67, 68 of the reference frame to be searched, except that the size of the regions 65, 66, 67, 68 of the reference frame is restricted compared to those shown in FIG. 6b. This therefore helps to reduce the memory bandwidth being used when reading the regions 65, 66, 67, 68 of the reference frame from the cache 12.

Another restriction, imposed by modifying the relevant encoding parameters, is shown in FIG. 6d. This shows the same blocks 61, 62, 63, 64 of the source frame and the same corresponding regions 65, 66, 67, 68 of the reference frame to be searched, except that the position of the regions 65, 66, 67, 68 of the reference frame is restricted compared to those shown in FIG. 6c, i.e. such that the regions position 65, 66, 67, 68 of the reference frame are close to or overlapping each other. This therefore helps to reduce the memory bandwidth being used when reading the regions 65, 66, 67, 68 of the reference frame from the cache 12 (or fetching the regions 65, 66, 67, 68 into the cache) because it is more likely that the blocks of the reference frame may already be present in the cache 12. (It should be noted that the restriction shown in FIG. 6b is on both the position and the size of the search regions 65, 66, 67, 68 of the reference frame; a restriction may be made only on the position and not the size, e.g. such that there is greater overlap between the regions 65, 66, 67, 68 of the reference frame.)

Thus, when there are further blocks of the source frame (or subsequent source frames) to encode (step 110, FIG. 4), these further blocks are encoded using the modified encoding process with the modified encoding parameters (step 111, FIG. 4). When there are no more blocks of the sequence of source frames to encode, the encoding of the source frames ends (step 108, FIG. 4).

When further blocks are encoded using the modified encoding process with the modified encoding parameters, as before the memory bandwidth is monitored for these blocks by the accumulator 15 (step 112, FIG. 4). The aim of the restriction on the memory bandwidth that has been imposed is to reduce the memory bandwidth, such that a target memory bandwidth limit is not exceeded for the frame. However, in some circumstances, e.g. owing to the nature and number of the blocks being used in the reference frame(s) for the encoding even when using the modified encoding parameters, the memory bandwidth may continue to increase after the restriction has been imposed, as shown in FIG. 5.

For this reason, the memory bandwidth as measured by the accumulator 15 is assessed for each group of blocks as to whether it is greater than a second, higher threshold (step 113, FIG. 4), as shown in FIG. 5. When the memory bandwidth is found to have exceeded this second, higher threshold for the group of blocks, the encoding parameters used in the video encoding process to encode subsequent blocks of the source frame are further modified (by the VPU firmware) to impose a greater restriction on the memory bandwidth being used when using the reference frames 13, 14 (step 114, FIG. 4). This further modification of the encoding parameters may impose one of the two restrictions shown in FIGS. 6a, 6b, 6c and 6d, e.g. in addition to one that has already been imposed by the first restriction, or instead may impose a different instruction.

A suitable, different modification to the video encoding process is to limit the number of reference frames that are allowed to be used in the encoding of a source frame (e.g. to 1 or 0). This more stringent restriction on the memory bandwidth (i.e. compared to the restrictions discussed above with respect to FIGS. 6a, 6b, 6c and 6d) is more likely to reduce the memory bandwidth being used when using the reference frames, subsequent to this restriction being imposed.

Thus, when there are further blocks of the source frame (or subsequent source frames) to encode (step 110, FIG. 4), these further blocks are encoded using the further modified encoding process with the further modified encoding parameters (step 111, FIG. 4). When there are no more blocks of the sequence of source frames to encode, the encoding of the source frames ends (step 108, FIG. 4). As can be seen in FIG. 5, the further modification to the video encoding process is made at the point in time 52 when the memory bandwidth exceeds the second upper threshold. This restriction acts quickly to reduce the memory bandwidth.

As before, the memory bandwidth is monitored for these blocks by the accumulator 15 (step 112, FIG. 4). When the memory bandwidth being used when using the reference frames in the encoding of these subsequent source blocks reduces, owing to the restrictions that have been imposed, the memory bandwidth is assessed against a lower threshold (step 115, FIG. 4). When the memory bandwidth is above the lower threshold and there are still blocks in the sequence of source frames to encode (step 110, FIG. 4), these further blocks are continued to be encoded using the further modified encoding process with the further modified encoding parameters (step 111, FIG. 4). When there are no more blocks of the sequence of source frames to encode, the encoding of the source frames ends (step 108, FIG. 4).

When the memory bandwidth falls below the lower threshold (step 115, FIG. 4 and as shown in the point in time 53 in FIG. 5), the modifications that have been made previously to the video encoding process are disabled (i.e. the encoding parameters to be used for the encoding are returned to those used originally). When there are still more blocks of the source frame (or subsequent source frames) to encode (step 107, FIG. 4), these further blocks are encoded (step 104, FIG. 4) using the original video encoding process, with the memory bandwidth being monitored as before for these blocks by the accumulator 15 (step 105, FIG. 4). When there are no more blocks of the sequence of source frames to encode, the encoding of the source frames ends (step 108, FIG. 4).

In the above embodiments, there are only two thresholds against which the memory bandwidth being used when using the reference frames is assessed. However, other arrangements would be possible, and in general any number of thresholds may be used and corresponding restrictions imposed. The present embodiments extend to such arrangements.

It can be seen from the above that the technology described herein, in embodiments at least, provides an efficient and effective mechanism for controlling the memory bandwidth usage in a video encoding system.

This is achieved, in embodiments of the technology described herein at least, by modifying the video encoding process by which the source frame is being encoded using the reference frames, thus restricting the memory bandwidth being used when using the reference frames used to encode the source frame. In this way, the potentially large and variable memory bandwidth usage when using the reference frames used in the encoding process (e.g. owing to multiple reference frames being used per source frame and large areas within each reference being read to search for corresponding blocks) may be controlled in order to restrict the memory bandwidth, e.g. below a target bandwidth per frame. This helps to provide a more predictable memory bandwidth for the encoding process overall, thus, e.g., helping to free up resources for use elsewhere in a system.

Although the memory bandwidth usage restrictions are not guaranteed to reduce the memory bandwidth being used (e.g. immediately or directly), the modified video encoding process(es) restrict how reference frame(s) are used when encoding the subsequent part of a source frame. Thus, the modified video encoding process is able to control (e.g. cap) the memory bandwidth usage of the video processing system, e.g. as is required.

The foregoing detailed description has been presented for the purposes of illustration and description. It is not intended to be exhaustive or to limit the invention to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of encoding frames of a sequence of source frames of video image data to be encoded using a plurality of processing cores, the method comprising, for each of the plurality of processing cores:
    using a video encoding process that encodes at least some of the frames of the sequence of source video frames to be encoded using one or more reference frames derived from one or more other source frames in the sequence of source video frames;
    the method further comprising, for each of the plurality of processing cores:
    when encoding a source frame of the sequence of source video frames using one or more reference frames, monitoring the memory bandwidth being used when using the one or more reference frames when encoding the source frame by monitoring the number of cache accesses by a cache to a memory to the one or more reference frames used when encoding the source frame; and
    when the total monitored memory bandwidth being used for all of the processing cores combined is greater than a threshold:
        one or more of the plurality of processing cores encoding a subsequent part of the source frame using a modified video encoding process to restrict the memory bandwidth usage when using one or more reference frames when encoding the subsequent part of the source frame.

2. The method as claimed in claim 1, wherein the threshold is based on a target memory bandwidth to be used for encoding the source frame as a whole.

3. The method as claimed in claim 1, wherein the memory bandwidth is monitored by monitoring a measure representative of data read from the cache and/or into the cache from the memory when using one of more reference frames for encoding a source frame that are stored in the cache and/or the memory.

4. The method as claimed in claim 1, the method comprising:
    using a video encoding process that encodes blocks of at least some of the frames of the sequence of source video frames to be encoded using one or more reference blocks derived from blocks of one or more other source frames in the sequence of source video frames;
    the method further comprising, for each of the plurality of processing cores:
    when encoding one or more blocks of a source frame of the sequence of source video frames using one or more reference blocks, monitoring the memory bandwidth being used when using the one or more reference blocks when encoding the one or more source blocks; and
    when the total monitored memory bandwidth being used for all of the processing cores combined is greater than a threshold:
        one or more of the plurality of processing cores encoding subsequent blocks of the source frame using a modified video encoding process to restrict the memory bandwidth usage when using one or more reference blocks when encoding the subsequent blocks of the source frame.

5. The method as claimed in claim 4, wherein the memory bandwidth is monitored by determining, for each block of a source frame that is encoded, the number of accesses by the cache to the memory for the one or more reference frames used when encoding the source frame, and assessing a moving average or accumulated total of the accesses by the cache to the memory for a group of a plurality of blocks of the source frame against the threshold to determine when the monitored memory bandwidth usage is greater than the threshold.

6. The method as claimed in claim 5, wherein the step of determining the number of accesses by the cache to the memory for the one or more reference frames used when encoding the source frame is performed deterministically for the encoding of the source frame.

7. The method as claimed in claim 1, the method comprising:
when the total monitored memory bandwidth being used for all of the processing cores combined is greater than a first threshold representing a first level of memory bandwidth usage:
one or more of the plurality of processing cores encoding a subsequent part of the source frame using a first modified video encoding process to restrict the memory bandwidth being used when using one or more reference frames when encoding the subsequent part of the source frame; and
when the total monitored memory bandwidth being used for all of the processing cores combined is greater than a second threshold representing a second level of memory bandwidth usage, wherein the second level is higher than the first level:
one or more of the plurality of processing cores encoding a subsequent part of the source frame using a second modified video encoding process to further restrict the memory bandwidth being used when using one or more reference frames when encoding the subsequent part of the source frame.

8. The method as claimed in claim 1, wherein the modified video encoding process places a restriction on one or more of:
the number of reference frames that are to be used when encoding the subsequent part of the source frame;
the size of the area of the one or more reference frames that is to be searched when encoding the subsequent part of the source frame using the one or more reference frames; and
the position of the area in each of the one or more reference frames that is to be searched when encoding the subsequent part of the source frame using the one or more reference frames.

9. The method as claim 1, the method comprising:
modifying a set of encoding parameters for use in encoding the subsequent part of the source frame, when the total monitored memory bandwidth being used for all of the processing cores combined is greater than the threshold, and one or more of the plurality of processing cores encoding the subsequent part of the source frame using the modified set of encoding parameters in the modified video encoding process.

10. The method as claimed in claim 1, the method comprising, for each of the plurality of processing cores:
when encoding a source frame of the sequence of source video frames using the modified video encoding process that uses one or more reference frames derived from one or more other source frames in the sequence of source frames, monitoring the memory bandwidth when using the one or more reference frames being used when encoding the source frame; and
when the total monitored memory bandwidth being used for all of the processing cores combined falls below a lower threshold:
one or more of the plurality of processing cores encoding a subsequent part of the source frame using the original video encoding process.

11. An apparatus for encoding frames of a sequence of source frames of video image data to be encoded, the apparatus comprising:
a plurality of processing cores; and
a cache for storing data of one or more reference frames;
wherein each processing core of the plurality of processing cores comprises:
encoding circuitry capable of:
encoding, using a video encoding process, at least some of the frames of the sequence of source video frames to be encoded using one or more reference frames derived from one or more other source frames in the sequence of source video frames;
monitoring circuitry capable of, when the encoding circuitry is encoding a source frame of the sequence of source video frames using one or more reference frames:
monitoring the memory bandwidth being used when using the one or more reference frames when encoding the source frame by monitoring the number of cache accesses by the cache to a memory to the one or more reference frames used when encoding the source frame; and
control circuitry operable to, in response to the total monitored memory bandwidth being used for all of the processing cores combined being greater than a threshold:
control the encoding circuitry of one or more of the plurality of processing cores to encode a subsequent part of the source frame using a modified video encoding process to restrict the memory bandwidth usage when using one or more reference frames when encoding the subsequent part of the source frame.

12. The apparatus as claimed in claim 11, wherein the threshold is based on a target memory bandwidth to be used for encoding the source frame as a whole.

13. The apparatus as claimed in claim 11, wherein the monitoring circuitry is capable of monitoring the memory bandwidth by monitoring a measure representative of data read from the cache and/or into the cache from the memory when using one of more reference frames for encoding a source frame that are stored in the cache and/or the memory.

14. The apparatus as claimed in claim 11, wherein the encoding circuitry is capable of:
encoding, using a video encoding process, blocks of at least some of the frames of the sequence of source video frames to be encoded using one or more reference blocks derived from blocks of one or more other source frames in the sequence of source video frames; and
wherein the monitoring circuitry is capable of, when the encoding circuitry is encoding one or more blocks of a source frame of the sequence of source video frames using one or more reference blocks:
monitoring the memory bandwidth being used when using the one or more reference blocks when encoding the one or more source blocks; and
wherein the encoding circuitry of one or more of the plurality of processing cores is further capable of, when the total monitored memory bandwidth being used for all of the processing cores combined is greater than a threshold:

encoding subsequent blocks of the source frame using a modified video encoding process to restrict the memory bandwidth usage when using one or more reference blocks when encoding subsequent blocks of a source frame.

15. The apparatus as claimed in claim 14, wherein the monitoring circuitry is capable of monitoring the memory bandwidth by determining, for each block of a source frame that is encoded, the number of accesses by the cache to the memory to the one or more reference frames used when encoding the source frame, and assessing a moving average or accumulated total of the accesses by the cache to the memory for a group of a plurality of blocks of the source frame against the threshold to determine when the monitored memory bandwidth usage is greater than the threshold.

16. The apparatus as claimed in claim 15, wherein the monitoring circuitry is capable of determining the number of accesses by the cache to the memory for the one or more reference frames used when encoding the source frame deterministically for the encoding of the source frame.

17. The apparatus as claimed in claim 11, wherein the control circuitry is operable to, in response to the total monitored memory bandwidth being used for all of the processing cores combined being greater than a first threshold representing a first level of memory bandwidth usage:
control the encoding circuitry of one or more of the plurality of processing cores to encode a subsequent part of the source frame using a first modified video encoding process to restrict the memory bandwidth being used when using one or more reference frames when encoding the subsequent part of the source frame; and
wherein the control circuitry is operable to, in response to the total monitored memory bandwidth being used for all of the processing cores combined being greater than a second threshold representing a second level of memory bandwidth usage, wherein the second level is higher than the first level:
control the encoding circuitry of one or more of the plurality of processing cores to encode a subsequent part of the source frame using a second modified video encoding process to further restrict the memory bandwidth being used when using one or more reference frames when encoding the subsequent part of the source frame.

18. The apparatus as claimed in claim 11, wherein the encoding circuitry is capable of using the modified video encoding process to place a restriction on one or more of:
the number of reference frames that are to be used when encoding the subsequent part of the source frame;
the size of the area of the one or more reference frames that is to be searched when encoding the subsequent part of the source frame using the one or more reference frames; and
the position of the area in each of the one or more reference frames that is to be searched when encoding the subsequent part of the source frame using the one or more reference frames.

19. The apparatus as claimed in claim 11, wherein the encoding circuitry is capable of:
modifying a set of encoding parameters for use in encoding the subsequent part of the source frame, when the total monitored memory bandwidth being used for all of the processing cores combined is greater than the threshold, and
the encoding circuitry of one or more of the plurality of processing cores is capable of encoding the subsequent part of the source frame using the modified set of encoding parameters in the modified video encoding process.

20. The apparatus as claimed in claim 11, wherein the monitoring circuitry is capable of, when the encoding circuitry is encoding a source frame of the sequence of source video frames using the modified video encoding process that uses one or more reference frames derived from one or more other source frames in the sequence of source frames:
monitoring the memory bandwidth when using the one or more reference frames being used when encoding the source frame; and
wherein the control circuitry is operable to, in response to the total monitored memory bandwidth being used for all of the processing cores combined falling below a lower threshold:
control the encoding circuitry of one or more of the plurality of processing cores to encode a subsequent part of the source frame using the original video encoding process.

21. A non-transitory computer readable storage medium storing computer software code which when executing on a data processing system performs a method of encoding frames of a sequence of source frames of video image data to be encoded using a plurality of processing cores, the method comprising, for each of the plurality of processing cores:
using a video encoding process that encodes at least some of the frames of the sequence of source video frames to be encoded using one or more reference frames derived from one or more other source frames in the sequence of source video frames;
the method further comprising, for each of the plurality of processing cores:
when encoding a source frame of the sequence of source video frames using one or more reference frames, monitoring the memory bandwidth being used when using the one or more reference frames when encoding the source frame by monitoring the number of cache accesses by a cache to a memory to the one or more reference frames used when encoding the source frame; and
when the total monitored memory bandwidth being used for all of the processing cores combined is greater than a threshold:
one or more of the plurality of processing cores encoding a subsequent part of the source frame using a modified video encoding process to restrict the memory bandwidth usage when using one or more reference frames when encoding the subsequent part of the source frame.

* * * * *